United States Patent
Furihata et al.

(10) Patent No.: US 10,192,286 B2
(45) Date of Patent: Jan. 29, 2019

(54) DEVICE AND METHOD FOR IMAGE ENLARGEMENT AND DISPLAY PANEL DRIVER USING THE SAME

(71) Applicant: SYNAPTICS JAPAN GK, Tokyo (JP)

(72) Inventors: Hirobumi Furihata, Tokyo (JP); Takashi Nose, Tokyo (JP); Masao Orio, Tokyo (JP)

(73) Assignee: Synaptics Japan GK, Nakano, Tokyo (JP)

( * ) Notice: Subject to any disclaimer, the term of this patent is extended or adjusted under 35 U.S.C. 154(b) by 519 days.

(21) Appl. No.: 14/847,125

(22) Filed: Sep. 8, 2015

(65) Prior Publication Data
US 2016/0078599 A1 Mar. 17, 2016

(30) Foreign Application Priority Data
Sep. 11, 2014 (JP) .................. 2014-185612

(51) Int. Cl.
- *G06T 3/40* (2006.01)
- *G09G 5/391* (2006.01)
- *H04N 1/00* (2006.01)

(52) U.S. Cl.
CPC .............. *G06T 3/4007* (2013.01); *G06T 3/40* (2013.01); *G06T 3/403* (2013.01); *G09G 5/391* (2013.01);
(Continued)

(58) Field of Classification Search
CPC ......... G06T 3/40; G06T 3/403; G06T 3/4007; G09G 5/391; G09G 2310/0216; G09G 2340/04; H04N 1/00469
See application file for complete search history.

(56) References Cited

U.S. PATENT DOCUMENTS

| 6,002,811 A | * | 12/1999 | Koshimizu | G06T 3/40 |
| | | | | 358/462 |
| 2004/0001632 A1 | * | 1/2004 | Adachi | G06K 9/6814 |
| | | | | 382/224 |

(Continued)

FOREIGN PATENT DOCUMENTS

| JP | H08171633 A | 7/1996 |
| JP | H09-102867 A | 4/1997 |

(Continued)

OTHER PUBLICATIONS

Office Action from Japanese Patent Application No. 2014-185612 dated Sep. 19, 2018.

*Primary Examiner* — Jwalant Amin
(74) *Attorney, Agent, or Firm* — Patterson + Sheridan, LLP

(57) ABSTRACT

A display panel driver includes a scaler circuit performing image enlargement processing on input image data corresponding to an input image to generate α-times enlarged image data corresponding to an α-times enlarged image (α is a number larger than one which cannot be represented as $2^k$); and a driver section driving a display panel. In calculating a pixel value of a target pixel of the α-times enlarged image, the scaler circuit generates enlarged image data including $2^n$-times enlarged image data corresponding to a $2^n$-times enlarged image obtained by enlarging the input image with an enlargement factor of $2^n$ (n is the smallest integer determined so that $2^n$ is larger than α), and calculates the pixel value of the target pixel from the $2^n$-times enlarged image data through interpolation processing of pixel values of pixels of the $2^n$-times enlarged image corresponding to the target pixel of the α-times enlarged image.

12 Claims, 17 Drawing Sheets

(52) U.S. Cl.
CPC . *G09G 2310/0216* (2013.01); *G09G 2340/04* (2013.01); *H04N 1/00469* (2013.01)

(56) References Cited

U.S. PATENT DOCUMENTS

| | | | | |
|---|---|---|---|---|
| 2004/0264809 | A1* | 12/2004 | Uetani | G06T 3/4007 382/300 |
| 2006/0056735 | A1* | 3/2006 | De Haan | G06T 3/4084 382/299 |
| 2008/0055338 | A1* | 3/2008 | Wei | G06T 3/403 345/667 |
| 2009/0034848 | A1* | 2/2009 | Sakamoto | G06K 9/3283 382/195 |
| 2009/0184983 | A1* | 7/2009 | Nose | G09G 3/2059 345/690 |
| 2009/0190795 | A1* | 7/2009 | Derkalousdian | G06K 9/00 382/100 |
| 2013/0121611 | A1 | 5/2013 | Moriya et al. | |
| 2015/0288935 | A1* | 10/2015 | Shinozaki | H04N 5/2176 348/322 |

FOREIGN PATENT DOCUMENTS

| | | | |
|---|---|---|---|
| JP | H10-63826 | A | 3/1998 |
| JP | 2000099713 | A | 4/2000 |
| JP | 2001094765 | A | 4/2001 |
| JP | 2002330283 | A | 11/2002 |
| JP | 2002351453 | A | 12/2002 |
| JP | 2007193397 | A | 8/2007 |
| JP | 2009094862 | A | 4/2009 |
| JP | 2011049868 | A | 3/2011 |
| JP | 2012156666 | A | 8/2012 |
| JP | 2014126774 | A | 7/2014 |
| WO | 2012114574 | A1 | 8/2012 |

* cited by examiner

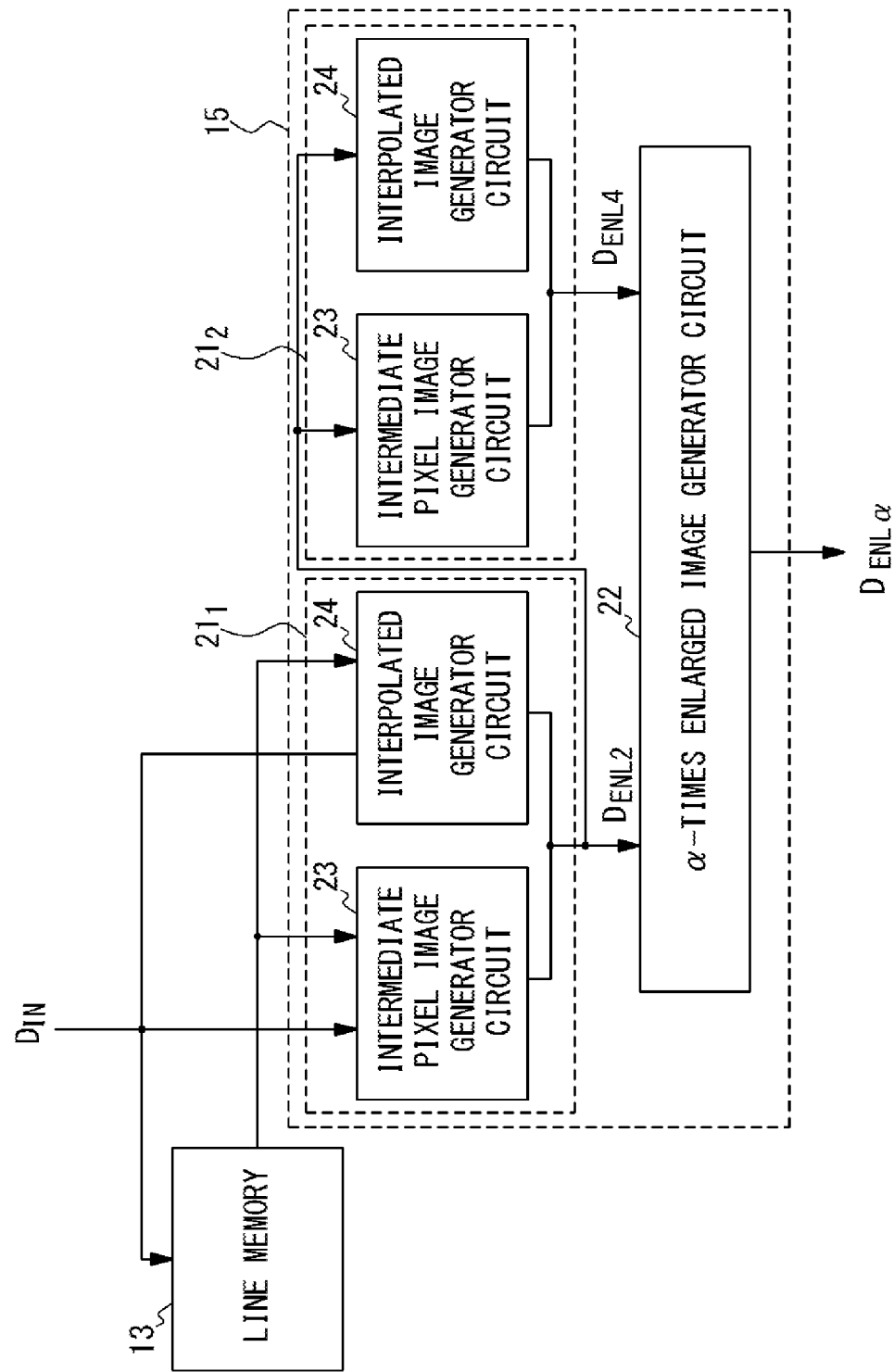

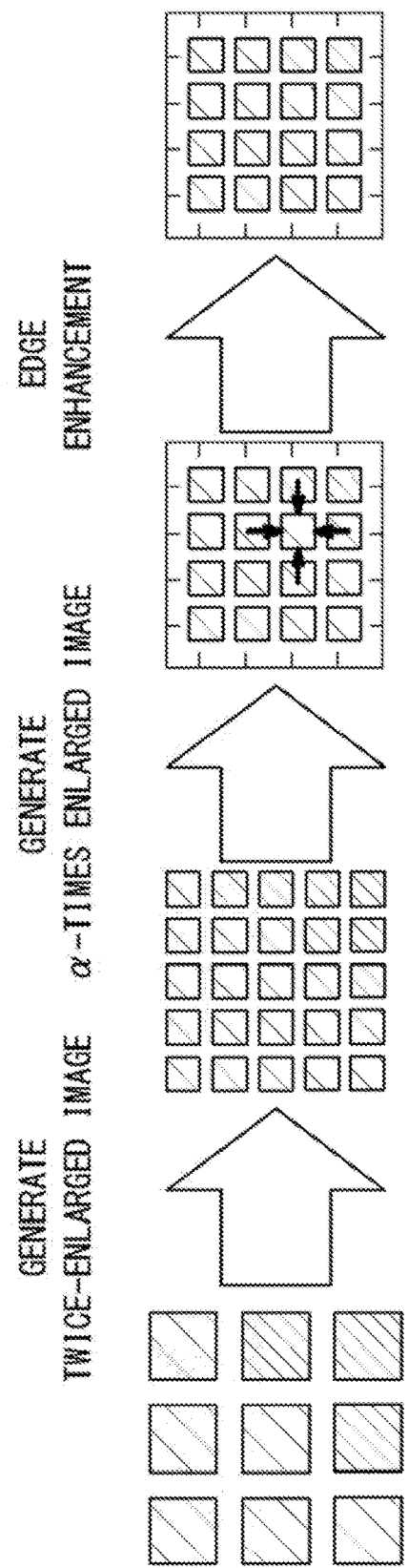

Fig. 13B

| | INPUT IMAGE | 4/3-TIMES ENLARGED IMAGE | EDGE ENHANCED IMAGE |
|---|---|---|---|
| BEFORE SCROLL | 3×3 block with 255s and 0s (A) | 6×6 block, average value with respect to eight pixels: 96 | 6×6 block, average value with respect to eight pixels: 16 |
| AFTER ONE-DOT RIGHTWARD SCROLL | 3×3 block with 255s and 0s (A) | 6×6 block, average value with respect to eight pixels: 96 | 6×6 block, average value with respect to eight pixels: 87.5 |

LARGE CHANGES IN AVERAGE VALUE ⇒ FLICKER GENERATED

Fig. 14B

| | INPUT IMAGE | 4/3-TIMES ENLARGED IMAGE | EDGE ENHANCED IMAGE |
|---|---|---|---|
| BEFORE SCROLL | 255 255 255 / A 255<br>255 0 0 0 255<br>255 0 0 0 255<br>255 0 0 0 255 | 255 255 255 255 255 255<br>255 96 96 96 255 255<br>255 96 96 96 255 255<br>255 96 96 96 255 255<br>255 96 96 96 255 255<br>AVERAGE VALUE WITH<br>RESPECT TO EIGHT PIXELS:96 | 255 255 255 255 255 255<br>255 64 64 64 64 255<br>255 64 64 64 64 255<br>255 64 64 64 64 255<br>255 64 64 64 64 255<br>AVERAGE VALUE WITH<br>RESPECT TO EIGHT PIXELS:64 |
| AFTER ONE-DOT RIGHTWARD SCROLL | 255 255 255 / A 255<br>255 255 0 0 255<br>255 255 0 0 255<br>255 255 0 0 255 | 255 255 255 255 255 255<br>255 255 32 32 32 255<br>255 160 160 160 255 255<br>255 160 160 160 255 255<br>255 160 160 160 255 255<br>AVERAGE VALUE WITH<br>RESPECT TO EIGHT PIXELS:96 | 255 255 255 255 255 255<br>255 255 0 0 0 255<br>255 175 175 175 255<br>255 175 175 175 255<br>255 175 175 175 255<br>AVERAGE VALUE WITH<br>RESPECT TO EIGHT PIXELS:87.5 |

REDUCED CHANGES IN AVERAGE VALUE ⇒ FLICKER SUPPRESSED

DEVICE AND METHOD FOR IMAGE ENLARGEMENT AND DISPLAY PANEL DRIVER USING THE SAME

CROSS REFERENCE

This application claims priority of Japanese Patent Application No. 2014-185612, filed on Sep. 11, 2014, the disclosure which is incorporated herein by reference.

TECHNICAL FIELD

The present invention relates to a display panel driver, display device, image processing device and image processing method, and more particularly, to image enlargement processing suitable for a display panel driver, display device and image processing device.

BACKGROUND ART

Image enlargement processing is one of the most typical image processing techniques and various techniques have been proposed for image enlargement processing. In addition, it is well known in the art that edges are often blurred in an enlarged image obtained by image enlargement processing and various edge enhancement techniques for enlarged images have been also proposed.

For example, International Publication No. WO 2012/114574 A1 discloses an image enlargement method in which the pixel value of each pixel of a high-resolution image are calculated by interpolation of pixel values of multiple pixels of a low-resolution image. In this image enlargement method, appropriate interpolation processing is achieved by giving a large interpolation coefficient to a highly-correlated pixel of the low-resolution image independently of the shape of an edge, the highly-correlated pixel being highly correlated with a pixel of interest.

Japanese Patent Application Publication No. 2013-165476 A discloses a technique for improving the image quality, which involves generating an edge-enhanced enlarged image and correcting the enlarged image on the basis of the difference between the enlarged image and the input image.

Japanese Patent Application Publication No. 2011-049868 A discloses a technique for achieving edge enhancement, which involves extracting high frequency components of an input image and feeding the high frequency components back to an enlarged image.

Japanese Patent Application Publication No. 2009-094862 A discloses a technique which involves detecting the direction of an edge by applying a differentiation operator to an input image, calculating a candidate value as a weighted average based on the direction of the detected edge and calculating an interpolated value of an interpolation pixel by performing limiting processing on the candidate value.

Japanese Patent Application Publication No. 2007-193397 A discloses a technique for performing image scaling processing and edge enhancement at the same time by switching filter coefficients of a polyphase filter used for the scaling processing between a basic process portion and a high-frequency enhanced portion.

Japanese Patent Application Publication No. 2000-99713 A discloses a technique for obtaining an enlarged image by dividing a multi-value image into an edge portion and a non-edge portion, individually performing image enlargement processing on the edge portion and the non-edge portion and finally synthesizing the resultant enlarged images obtained from the edge portion and the non-edge portion.

Japanese Patent Application Publication No. H09-102867 A discloses a technique which involves analyzing an input image in units of windows each consisting of 2×2 pixels, and generating an enlarged image on the basis of the analysis.

Japanese Patent Application Publication No. H10-63826 A discloses a technique for generating a multi-value image data scaled by a desired scaling factor through performing image enlargement processing on a binary image with an enlargement factor of M and then performing an image reduction with a reduction factor of N.

Japanese Patent Application Publication No. 2001-94765 A discloses a technique which involves generating an enlarged image data by performing image enlargement processing on input image data, generating quality-improved image data by applying a filter to the enlarged image data and obtaining output image data by performing image reduction processing on the quality-improved image data.

SUMMARY

In one embodiment, a display panel driver is provided that includes a scaler circuit and a driver section. The scaler circuit is configured to perform image enlargement processing on input image data corresponding to an input image to generate α-times enlarged image data corresponding to an α-times enlarged image obtained by enlarging the input image with an enlargement factor of α (α is a number larger than one which cannot be represented as $2^k$ for k being any natural number). The driver section is configured to drive a display panel in response to the α-times enlarged image data. The scaler circuit, in calculating a pixel value of a first target pixel of the α-times enlarged image, is configured to generate enlarged image data including $2^n$-times enlarged image data corresponding to a $2^n$-times enlarged image obtained by enlarging the input image with an enlargement factor of $2^n$ (n is the smallest integer determined so that $2^n$ is larger than α). The scaler circuit is further configured to calculate the pixel value of the first target pixel from the $2^n$-times enlarged image data through interpolation processing of pixel values of selected pixels of the $2^n$-times enlarged image, the selected pixels of the $2^n$-times enlarged image corresponding to the first target pixel of the α-times enlarged image.

In another embodiment, a display device is provided that includes a display panel and a display panel driver. The display panel driver is configured to drive the display panel in response to input image data corresponding to an input image. The display panel driver includes a scaler circuit configured to perform image enlargement processing on the input image data to generate α-times enlarged image data corresponding to an α-times enlarged image obtained by enlarging the input image with an enlargement factor of α (α is a number larger than one which cannot be represented as $2^k$ for k being any natural number). The and display panel driver includes a driver section configured to drive the display panel in response to the α-times enlarged image data. The scaler circuit, in calculating a pixel value of a first target pixel of the α-times enlarged image, is configured to generate enlarged image data including $2^n$-times enlarged image data corresponding to a $2^n$-times enlarged image obtained by enlarging the input image with an enlargement factor of $2^n$ (n is the smallest integer determined so that $2^n$ is larger than α), and calculates the pixel value of the first target pixel from the $2^n$-times enlarged image data through interpolation processing of pixel values of selected pixels of the $2^n$-times enlarged image, the selected pixels of the $2^n$-times enlarged image corresponding to the first target pixel of the α-times enlarged image.

In yet another embodiment, an image processing device is provided that includes a scaler circuit and an α-times enlarged image generator circuit. The scaler circuit is configured to perform image enlargement processing on input image data corresponding to an input image to generate α-times enlarged image data corresponding to an α-times enlarged image obtained by enlarging the input image with an enlargement factor of α (α is a number larger than one which cannot be represented as $2^k$ for k being any natural number). The scaler circuit includes a $2^n$-times enlarged image generator circuit configured to generate enlarged image data including $2^n$-times enlarged image data corresponding to a $2^n$-times enlarged image obtained by enlarging the input image with an enlargement factor of $2^n$ (n is the smallest integer determined so that $2^n$ is larger than α). The α-times enlarged image generator circuit is configured to generate the α-times enlarged image data from the $2^n$-times enlarged image data. The α-times enlarged image generator circuit, in calculating a pixel value of a first target pixel of the α-times enlarged image, is configured to calculate the pixel value of the first target pixel from the $2^n$-times enlarged image data through interpolation processing of pixel values of selected pixels of the $2^n$-times enlarged image, the selected pixels of the $2^n$-times enlarged image corresponding to the first target pixel of the α-times enlarged image.

In still another embodiment, an image processing method for performing image enlargement processing on input image data corresponding to an input image to generate α-times enlarged image data corresponding to an α-times enlarged image obtained by enlarging the input image with an enlargement factor of α (α is a number larger than one which cannot be represented as $2^k$ for k being any natural number) is provided. The method includes generating enlarged image data including $2^n$-times enlarged image data corresponding to a $2^n$-times enlarged image obtained by enlarging the input image with an enlargement factor of $2^n$ (n is the smallest integer determined so that $2^n$ is larger than α); and generating the α-times enlarged image data from the $2^n$-times enlarged image data, wherein, in calculating a pixel value of a first target pixel of the α-times enlarged image, the pixel value of the first target pixel is calculated from the $2^n$-times enlarged image data through interpolation processing of pixel values of selected pixels of the $2^n$-times enlarged image, the selected pixels of the $2^n$-times enlarged image corresponding to the first target pixel of the α-times enlarged image.

BRIEF DESCRIPTION OF THE DRAWINGS

The above and other advantages and features of the present technology will be more apparent from the following description taken in conjunction with the accompanied drawings, in which:

FIG. 11 is a block diagram illustrating an exemplary configuration of a scaler circuit adapted to an enlargement factor α more than one and less than four;

FIG. 12 conceptually illustrates image processing performed on an input image in the present embodiment;

FIG. 13B is a table illustrating the mechanism of generation of a flicker in the case when image enlargement processing with a non-integer enlargement factor is followed by commonly-known edge enhancement processing;

FIG. 14B is a table illustrating the mechanism of suppression of a flicker in the case when image enlargement processing with a non-integer enlargement factor is followed by the edge enhancement processing of the present embodiment.

DESCRIPTION OF PREFERRED EMBODIMENTS

Figure 1:
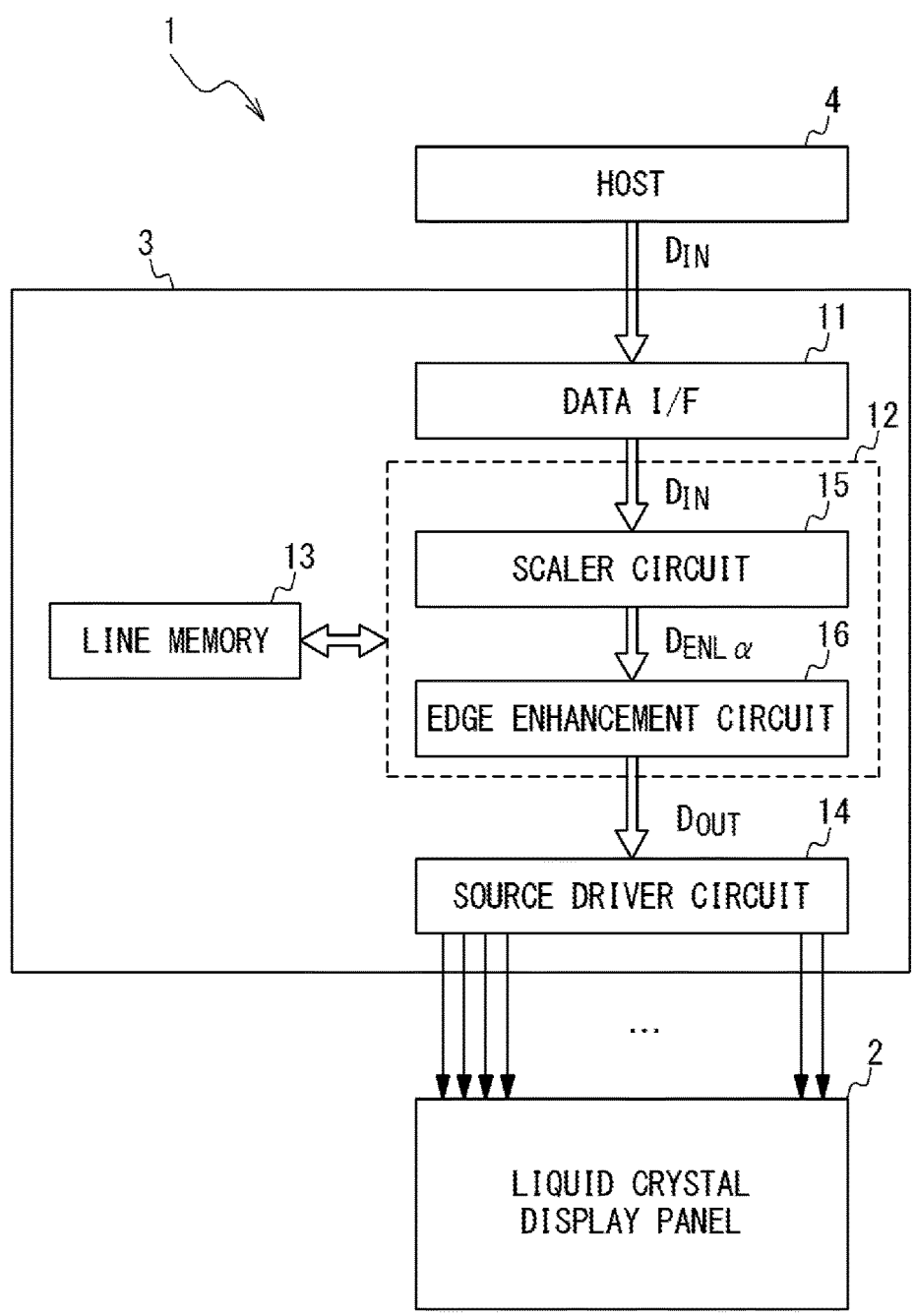
FIG. 1 is a block diagram illustrating an exemplary configuration of a display device in one embodiment of the present technology.

Introduction:

The inventors have been studying image enlargement processing with an enlargement factor of a non-integer value. According to the study by the inventors, one issue of image enlargement processing with an enlargement factor of a non-integer value is generation of blurs at diagonal edges, which are often included in characters and letters, for example. This is one of the factors causing image quality deterioration in an enlarged image.

Therefore, one advantage of the present technology is to improve the image quality of an enlarged image obtained by image enlargement processing.

Other advantages and features of the present technology would be understood from the following disclosure.

In an aspect of the present disclosure, a display panel driver includes a scaler circuit performing image enlargement processing on input image data corresponding to an input image to generate α-times enlarged image data corresponding to an α-times enlarged image obtained by enlarging the input image with an enlargement factor of α (α is a number larger than one which cannot be represented as $2^k$ for k being any natural number); and a driver section driving a display panel in response to the α-times enlarged image data. In calculating a pixel value of a target pixel of the α-times enlarged image, the scaler circuit generates enlarged image data including $2^n$-times enlarged image data corresponding to a $2^n$-times enlarged image obtained by enlarging the input image with an enlargement factor of $2^n$ (n is the smallest integer determined so that $2^n$ is larger than α), and calculates the pixel value of the target pixel from the $2^n$-times enlarged image data through interpolation processing of pixel values of selected pixels of the $2^n$-times enlarged image, the selected pixels of the $2^n$-times enlarged image corresponding to the target pixel of the α-times enlarged image.

In another aspect of the present technology, a display device includes a display panel and a display panel driver driving the display panel in response to input image data corresponding to an input image. The display panel driver includes: a scaler circuit performing image enlargement processing on the input image data to generate α-times enlarged image data corresponding to an α-times enlarged image obtained by enlarging the input image with an enlargement factor of α (α is a number larger than one which cannot be represented as $2^k$ for k being any natural number); and a driver section driving a display panel in response to the α-times enlarged image data. In calculating a pixel value of a target pixel of the α-times enlarged image, the scaler circuit generates enlarged image data including $2^n$-times enlarged image data corresponding to a $2^n$-times enlarged image obtained by enlarging the input image with an enlargement factor of $2^n$ (n is the smallest integer determined so that $2^n$ is larger than α), and calculates the pixel value of the target pixel from the $2^n$-times enlarged image data through interpolation processing of pixel values of selected pixels of the $2^n$-times enlarged image, the selected pixels of the $2^n$-times enlarged image corresponding to the target pixel of the α-times enlarged image.

In still another aspect of the present technology, an image processing device includes a scaler circuit performing image enlargement processing on input image data corresponding to an input image to generate α-times enlarged image data corresponding to an α-times enlarged image obtained by enlarging the input image with an enlargement factor of α (α is a number larger than one which cannot be represented as $2^k$ for k being any natural number). The scaler circuit includes: a $2^n$-times enlarged image generator circuit generating enlarged image data including $2^n$-times enlarged image data corresponding to a $2^n$-times enlarged image obtained by enlarging the input image with an enlargement factor of $2^n$ (n is the smallest integer determined so that $2^n$ is larger than α); and an α-times enlarged image generator circuit generating the α-times enlarged image data from the $2^n$-times enlarged image data. In calculating a pixel value of a target pixel of the α-times enlarged image, the α-times enlarged image generator circuit calculates the pixel value of the target pixel from the $2^n$-times enlarged image data through interpolation processing of pixel values of selected pixels of the $2^n$-times enlarged image, the selected pixels of the $2^n$-times enlarged image corresponding to the target pixel of the α-times enlarged image.

In still another aspect of the present technology, an image processing method is provided for performing image enlargement processing on input image data corresponding to an input image to generate α-times enlarged image data corresponding to an α-times enlarged image obtained by enlarging the input image with an enlargement factor of α (α is a number larger than one which cannot be represented as $2^k$ for k being any natural number). The method includes: generating enlarged image data including $2^n$-times enlarged image data corresponding to a $2^n$-times enlarged image obtained by enlarging the input image with an enlargement factor of $2^n$ (n is the smallest integer determined so that $2^n$ is larger than α); and generating the α-times enlarged image data from the $2^n$-times enlarged image data. In calculating a pixel value of a target pixel of the α-times enlarged image, the pixel value of the target pixel is calculated from the $2^n$-times enlarged image data through interpolation processing of pixel values of selected pixels of the $2^n$-times enlarged image, the selected pixels of the $2^n$-times enlarged image corresponding to the target pixel of the α-times enlarged image.

The present technology effectively improves the image quality of an enlarged image obtained by image enlargement processing.

The present technology will be now described herein with reference to illustrative embodiments. Those skilled in the art would recognize that many alternative embodiments can be accomplished using the teachings of the present disclosure and that the present technology is not limited to the embodiments illustrated for explanatory purposed. It will be appreciated that for simplicity and clarity of illustration, elements in the Figures have not necessary drawn to scale. For example, the dimensions of some of the elements are exaggerated relative to other elements.

One feature of image enlargement processing of embodiments of the present technology described in the following is that, to obtain an α-times enlarged image through image enlargement processing with an enlargement factor of α (α is a number larger than one which cannot be expressed as $2^k$ for k being a natural number), $2^n$-times enlarged image are generated by performing $2^n$-times image enlargement processing on an input image (n is the smallest natural number determined so that $2^n$ is larger than α), and the pixel values of each pixel of an α-times enlarged image are generated by interpolation of the pixel values of selected pixels of the $2^n$-times enlarged image, the selected pixels corresponding to the target pixel of the α-times enlarged image. Such image enlargement processing allows obtaining an α-times enlarged image of a high image quality in which blurs at diagonal edges are reduced, through simple arithmetic processing.

This is based on the principle that a $2^n$-times enlarged image can be easily obtained with reduced blurs at diagonal edges through simple arithmetic processing. A desired α-times enlarged image with smoothed diagonal edges can be obtained through interpolation of $2^n$-times enlarged image and this allows improving the image quality of the α-times enlarged image. In the following, a detailed description is given of embodiments of the present technology.

FIG. 1 is a block diagram schematically illustrating an exemplary configuration of a liquid crystal display device 1 in one embodiment of the present technology. The liquid crystal display device 1 includes a liquid crystal display panel 2 and a liquid crystal driver 3. The liquid crystal display device 1 is configured to display an image on the liquid crystal display panel 2 in response to input image data $D_{IN}$ received from a host 4, where the input image data $D_{IN}$ are image data corresponding to an input image which is to be displayed on the liquid crystal display panel 2; the grayscale level of each subpixel of each pixel of the liquid crystal display panel 2 is specified in the input image data $D_{IN}$. In the present embodiment, each pixel includes an R subpixel displaying the red (R) color, a G subpixel displaying the green (G) color and a B subpixel displaying the blue (B) color. In the present embodiment, input image data $D_{IN}$ corresponding to each pixel includes an R pixel value $R_{IN}$ indicating the grayscale level of the R subpixel, a G pixel value $G_{IN}$ indicating the grayscale level of the G subpixel and a B pixel value $B_{IN}$ indicating the grayscale level of the B subpixel. A CPU (central processing unit) or a DSP (digital signal processor) may be used as the host 4, for example.

The liquid crystal display panel 2 includes a plurality of gate lines (also referred to as scan lines or digit lines) and a plurality of source lines (also referred to as signal lines or data lines). The R, G and B subpixels are disposed at intersections of the corresponding gate lines and source lines.

The liquid crystal driver 3, which is a sort of display panel driver, is configured to receive the input image data $D_{IN}$ from the host 4 and to drive the source lines of the liquid crystal display panel 2 in response to the input image data $D_{IN}$. The liquid crystal driver 3 may further have the function of driving the gate lines of the liquid crystal display panel 2 or, when a gate line driver circuit is integrated in the liquid crystal display panel 2, controlling the gate line driver circuit.

In detail, the liquid crystal driver 3 includes a data interface 11, an image processing circuit 12, a line memory 13 and a source line driver circuit 14. The data interface 11 forwards the input image data $D_{IN}$ received from the host 4 to the image processing circuit 12. The image processing circuit 12 performs desired image processing on the input image data $D_{IN}$ to generate output image data $D_{OUT}$. In the present embodiment, the image processing circuit 12 includes a scaler circuit 15 and an edge enhancement circuit 16 to achieve image enlargement processing and edge enhancement processing. The line memory 13 is used as a work area for performing the image processing performed by the image processing circuit 12. The source line driver circuit 14 drives the source lines of the liquid crystal display panel 2 in response to the output image data $D_{OUT}$ received from the image processing circuit 12.

Figure 2:
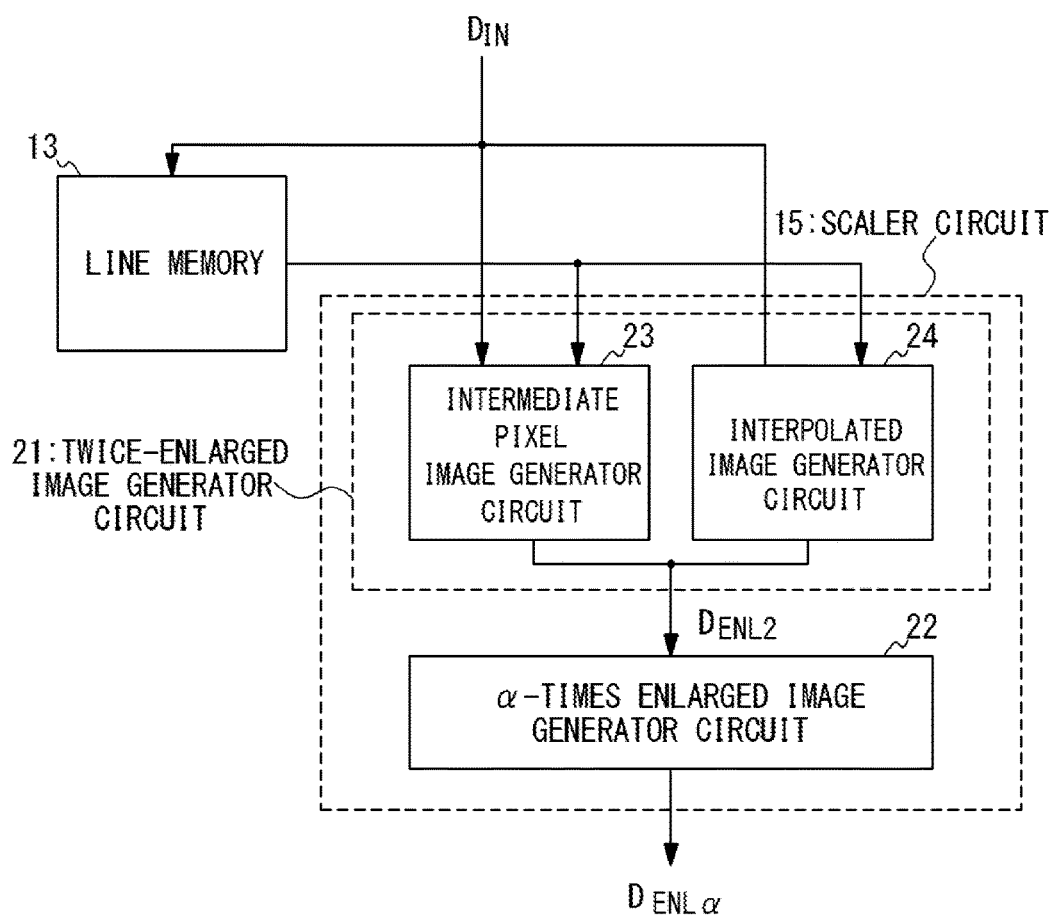
FIG. 2 is a block diagram illustrating an exemplary configuration of a scaler circuit in the present embodiment.

FIG. 2 is a block diagram illustrating an exemplary configuration of the scaler circuit 15 in the present embodiment. The scaler circuit 15 includes a twice-enlarged image generator circuit 21 and an $\alpha$-times enlarged image generator circuit 22.

The twice-enlarged image generator circuit 21 performs image enlargement processing on the input image data $D_{IN}$ with an enlargement factor of two to generate twice-enlarged image data $D_{ENL2}$ corresponding to a twice-enlarged image (an image obtained by enlarging the input image with an enlargement factor of two). The twice-enlarged image generator circuit 21 includes an intermediate pixel image generator circuit 23 and an interpolated image generator circuit 24, and generates the twice-enlarged image data $D_{ENL2}$ through the operations of these circuits. Details of the operations of the intermediate pixel image generator circuit 23 and the interpolated image generator circuit 24 will be described later. The $\alpha$-times enlarged image generator circuit 22 generates $\alpha$-times enlarged image data $D_{ENL\alpha}$, which are the targeted image data, through interpolation processing of the twice-enlarged image data $D_{ENL2}$. The scaler circuit 15 illustrated in FIG. 2 is adapted to generate the $\alpha$-times enlarged image data $D_{ENL\alpha}$ corresponding to the $\alpha$-times enlarged image from the input image data, for an enlargement factor $\alpha$ more than one and less than two.

In the following, a detailed description is given of the image processing performed in the image processing circuit 12 of the present embodiment, more specifically, the image enlargement processing performed by the scaler circuit 15 and the edge enhancement processing performed by the edge enhancement circuit 16.

(Image Enlargement Processing)

The scaler circuit 15 illustrated in FIG. 2 is configured to, in obtaining an $\alpha$-times enlarged image by performing image enlargement processing with an enlargement factor of $\alpha$ (where $\alpha$ is more than one and less than two), generate a twice-enlarged image by enlarging the input image with an enlarged factor of two and calculate the pixel values of a target pixel of the $\alpha$-times enlarged image through interpolation processing of the pixel values of selected pixels of the twice-enlarged image, the selected pixels corresponding to the target pixel of the $\alpha$-times enlarged image. In the following, a detailed description is given of the image enlargement processing performed by the scaler circuit 15.

Figure 3:
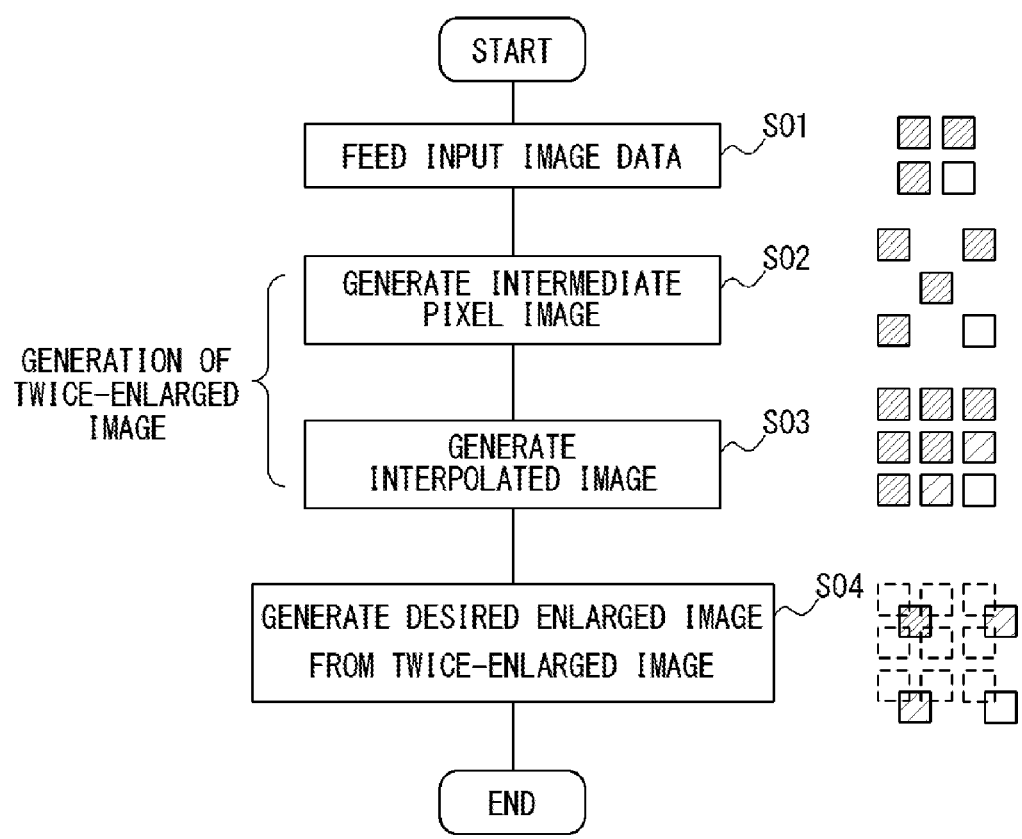
FIG. 3 is a flowchart illustrating processing contents of image enlargement processing in the present embodiment.
Figure 4:
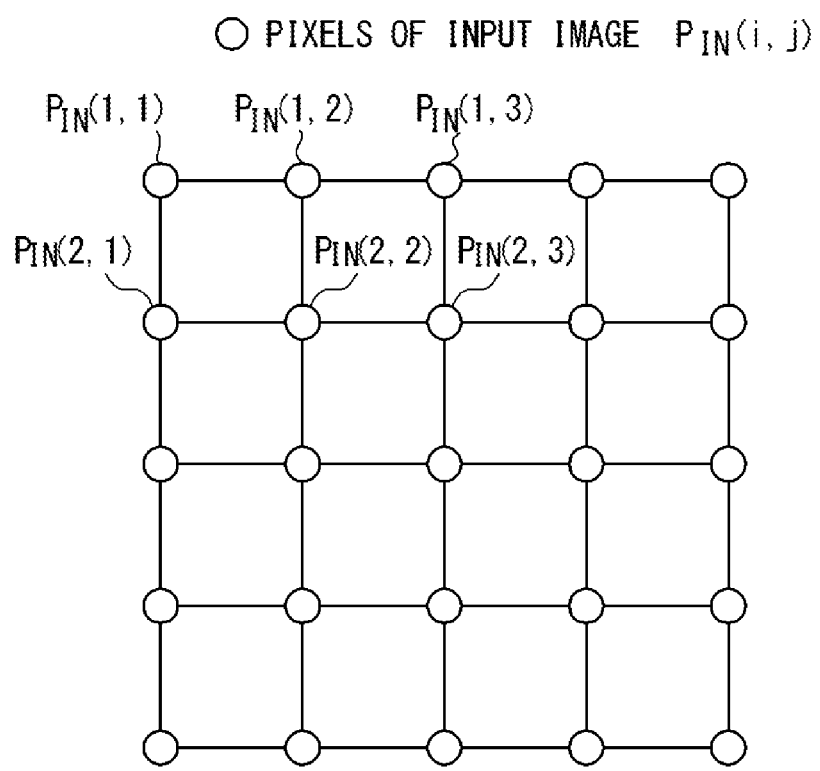
FIG. 4 conceptually illustrates an input image on which the image enlargement processing is to be performed in the present embodiment.

FIG. 3 is a flowchart illustrating details of the image enlargement processing performed by the scaler circuit 15 in the present embodiment. The input image data $D_{IN}$ transmitted from the host 4 to the liquid crystal driver 3 are successively fed to the scaler circuit 15 (at step S01). FIG. 4 conceptually illustrates the input image corresponding to the input image data $D_{IN}$. In the following, the pixel positioned in the i-th row and the j-th column of the input image may be referred to as pixel $P_{IN}(i, j)$ and input image data $D_{IN}$ corresponding to pixel $P_{IN}(i, j)$ may be denoted by $D_{IN}(i, j)$. Also, the R, G and B pixel values of the input image data $D_{IN}(i, j)$ may be denoted by $R_{IN}(i, j)$, $G_{IN}(i, j)$ and $B_{IN}(i, j)$, respectively.

Twice-enlarged image data $D_{ENL2}$ corresponding to a twice-enlarged image obtained by enlarging the input image with an enlargement factor of two are generated from the input image data $D_{IN}$. The generation of the twice-enlarged image data $D_{ENL2}$ includes the following two steps of:
(1) generating intermediate pixel image data corresponding to an intermediate pixel image, from the input image data $D_{IN}$ (at step S02), and
(2) generating interpolated image data corresponding to an interpolated image, from the input image data $D_{IN}$ (at step S03).

The intermediate pixel image data are generated by the intermediate pixel image generator circuit 23 and the interpolated image data are generated by the interpolated image generator circuit 24.

Figure 5A:
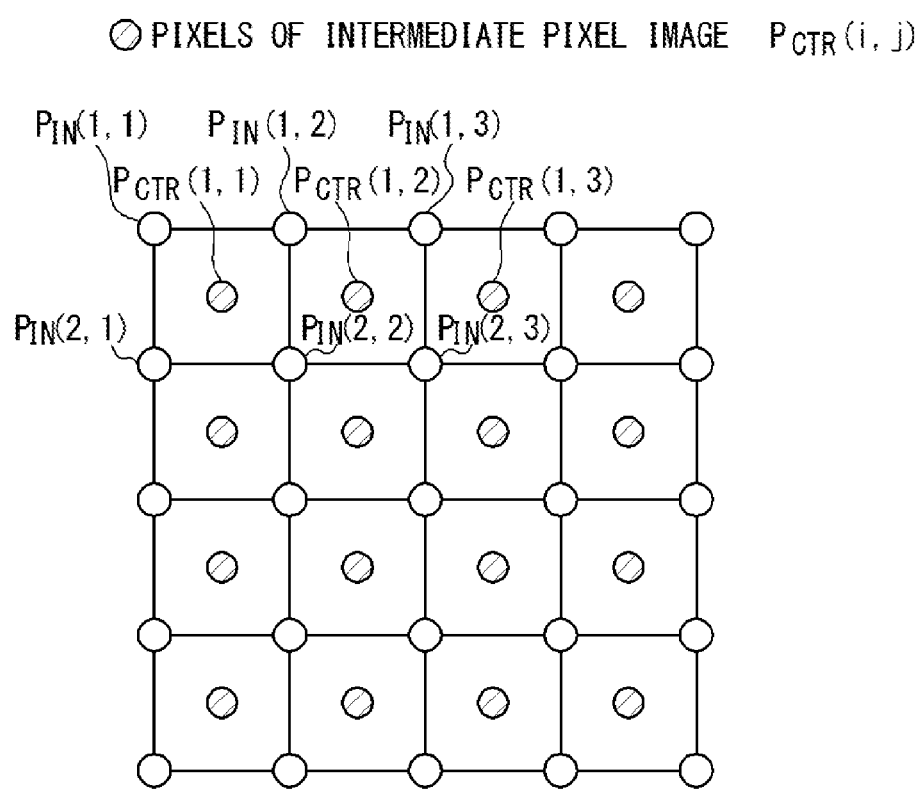
FIG. 5A conceptually illustrates an intermediate pixel image generated in the image enlargement processing in the present embodiment.

FIG. 5A conceptually illustrates the intermediate pixel image generated by the intermediate pixel image generator circuit 23. The intermediate pixel image is an image composed of intermediate pixels respectively defined for 2×2 pixel arrays included in the input image. In FIG. 5A, the pixel positioned in the i-th row and j-th column of the input image is denoted by $P_{IN}(i, j)$ and the pixel positioned in the i-th row and j-th column of the intermediate pixel image is denoted by $P_{CTR}(i, j)$. When the input image and the intermediate pixel image are superposed with each other, each intermediate pixel (that is, each pixel of the intermediate pixel image) is positioned at the center of the corresponding 2×2 pixel array.

Each pixel value of a pixel of the intermediate pixel image is calculated as the average of the corresponding pixel values of four pixels of the corresponding 2×2 pixel array other than the maximum and minimum values of the corresponding pixel values. In detail, the R pixel value $R_{CTR}(i, j)$, G pixel value $G_{CTR}(i, j)$ and B pixel value $B_{CTR}(i, j)$ of pixel $P_{CTR}(i, j)$ of the intermediate pixel image are calculated in accordance with the following expressions (1a) to (1c):

$$R_{CTR}(i, j)=(R_{IN}(i, j)+R_{IN}(i+1, j)+R_{IN}(i, j+1)+R_{IN}(i+1, j+1)-R_{MAX}-R_{MIN})/2, \quad (1a)$$

$$G_{CTR}(i, j)=(G_{IN}(i, j)+G_{IN}(i+1, j)+G_{IN}(i, j+1)+G_{IN}(i+1, j+1)-G_{MAX}-G_{MIN})/2, \text{ and} \quad (1b)$$

$$B_{CTR}(i, j)=(B_{IN}(i, j)+B_{IN}(i+1, j)+B_{IN}(i, j+1)+B_{IN}(i+1, j+1)-B_{MAX}-B_{MIN})/2, \quad (1c)$$

where i is an integer from 1 to H−1 and j is an integer from 1 to V−1; H is the number of pixels of the input image arrayed in the horizontal direction (row direction) and V is the number of pixels of the input image arrayed in the vertical direction (column direction).

The parameters $R_{MAX}$, $R_{MIN}$, $G_{MAX}$, $G_{MIN}$, $B_{MAX}$ and $B_{MIN}$ in these expressions are defined as follows: $R_{MAX}$ is the maximum value of the R pixel values $R_{IN}(i, j)$, $R_{IN}(i+1, j)$, $R_{IN}(i, j+1)$ and $R_{IN}(i+1, j+1)$ of the pixels of the corresponding 2×2 pixel array, and $R_{MIN}$ is the minimum value of the same. Correspondingly, $G_{MAX}$ is the maximum value of the G pixel values $G_{IN}(i, j)$, $G_{IN}(i+1, j)$, $G_{IN}(i, j+1)$ and $G_{IN}(i+1, j+1)$ of the pixels of the corresponding 2×2 pixel array, and $G_{MIN}$ is the minimum value of the same. Finally, $B_{MAX}$ is the maximum value of the B pixel values $B_{IN}(i, j)$, $B_{IN}(i+1, j)$, $B_{IN}(i, j+1)$ and $B_{IN}(i+1, j+1)$ of the pixels of the corresponding 2×2 pixel array, and $B_{MIN}$ is the minimum value of the same.

Figure 5B:
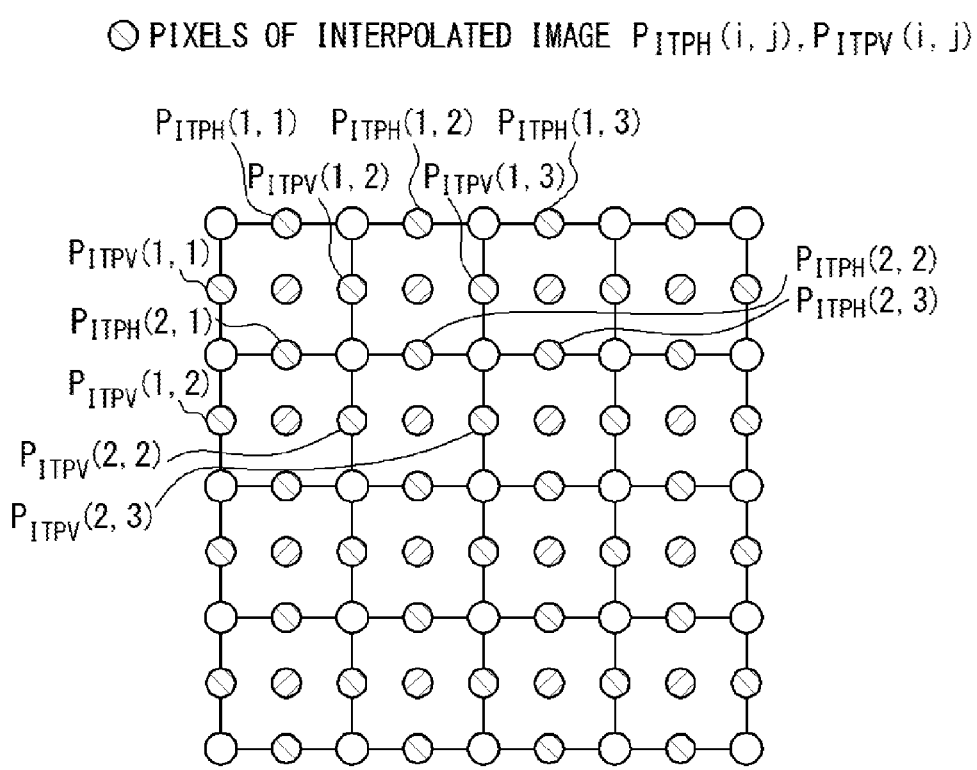
FIG. 5B conceptually illustrates an interpolated image generated in the image enlargement processing in the present embodiment.

FIG. 5B, on the other hand, conceptually illustrates the interpolated image generated by the interpolated image generator circuit 24. The interpolated image is an image composed of pixels each defined as a pixel positioned at the midpoint of every two pixels of the input image adjacent in the horizontal direction (row direction) or vertical direction (column direction). In FIG. 5B, each pixel of the interpolated image defined between two pixels of the input image adjacent in the horizontal direction (hereinafter, referred to as "horizontal interpolation pixel") is denoted by $P_{ITPH}(i, j)$ and each pixel of the interpolated image defined between two pixels of the input image adjacent in the vertical direction (hereinafter, referred to as "vertical interpolation pixel") is denoted by $P_{ITPV}(i, j)$. The horizontal interpolation pixel $P_{ITPH}(i, j)$ is a pixel positioned in the i-th row and j-th column of the horizontal interpolation pixels arrayed in rows and columns and the vertical interpolation pixel $P_{ITPV}(i, j)$ is a pixel positioned in the i-th row and j-th column of the vertical interpolation pixels arrayed in rows and columns.

The R pixel value $R_{ITPH}(i, j)$, G pixel value $G_{ITPH}(i, j)$ and B pixel value $B_{ITPH}(i, j)$ of the horizontal interpolation pixel $P_{ITPH}(i, j)$ are calculated in accordance with the following expressions (2a) to (2c):

$$R_{ITPH}(i, j)=(R_{IN}(i, j)+R_{IN}(i, j+1))/2, \quad (2a)$$

$$G_{ITPH}(i, j)=(G_{IN}(i, j)+G_{IN}(i, j+1))/2, \text{ and} \quad (2b)$$

$$B_{ITPH}(i, j)=(B_{IN}(i, j)+B_{IN}(i, j+1))/2, \quad (2c)$$

where i is an integer from 1 to H−1 and j is an integer from 1 to V−1.

Also, the R pixel value $R_{ITPV}(i, j)$, G pixel value $G_{ITPV}(i, j)$ and B pixel value $B_{ITPV}(i, j)$ of the vertical interpolation pixel $P_{ITPV}(i, j)$ are calculated in accordance with the following expressions (3a) to (3c):

$$R_{ITPV}(i, j)=(R_{IN}(i, j)+R_{IN}(i+1, j))/2, \quad (3a)$$

$$G_{ITPV}(i, j)=(G_{IN}(i, j)+G_{IN}(i+1, j))/2, \text{ and} \quad (3b)$$

$$B_{ITPV}(i, j)=(B_{IN}(i, j)+B_{IN}(i+1, j))/2, \quad (3c)$$

where i is an integer from 1 to H−1 and j is an integer from 1 to V−1.

Figure 6:
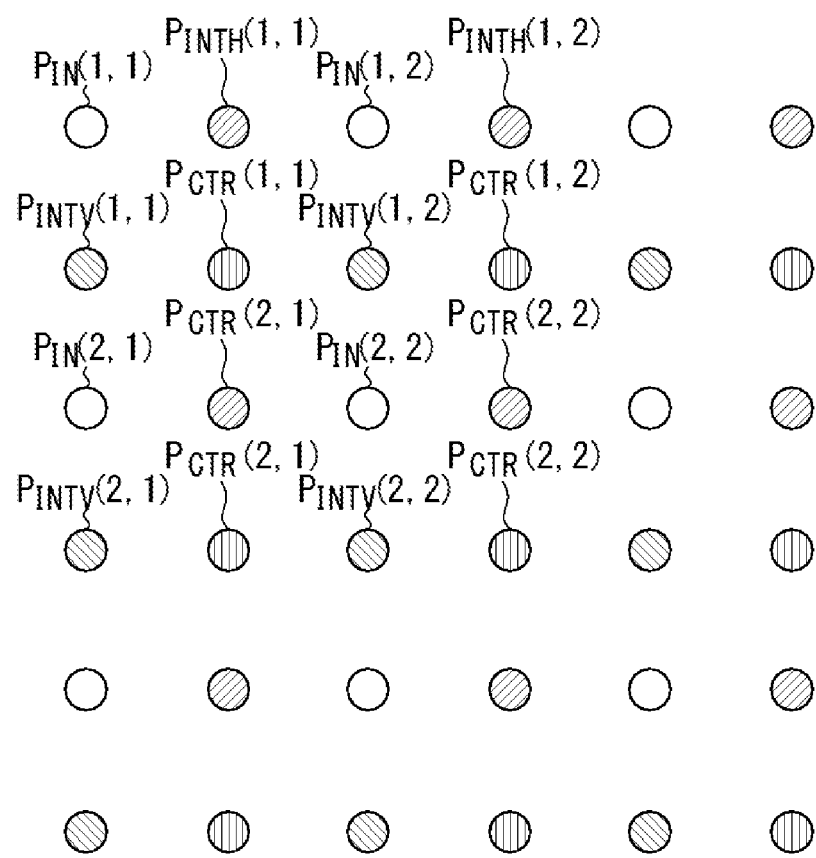
FIG. 6 conceptually illustrates a twice-enlarged image generated in the image enlargement processing in the present embodiment.

The twice-enlarged image is obtained as a superposition of the input image, the intermediate pixel image and the interpolated image described above. In other words, the twice-enlarged image data $D_{ENL2}$ are data incorporating the input image data $D_{IN}$, the intermediate pixel image data generated by the intermediate pixel image generator circuit 23 and the interpolated image data generated by the interpolated image generator circuit 24. FIG. 6 conceptually illustrates an exemplary twice-enlarged image. The odd-numbered rows of pixels of the twice-enlarged image are composed of the pixels of the input image data and the horizontal interpolation pixels of the interpolated image, and the even-numbered rows of pixels of the twice-enlarged image are composed of the pixels of the vertical interpolation pixels of the interpolated image and the pixels of the intermediate pixel image.

More specifically, the pixel values of the pixel positioned in the i-th row and the j-th column of the input image are used as the pixel values of pixel $P_{ENL2}(2i-1, 2j-1)$ positioned in the (2i−1)-th row and the (2j−1)-th column of the twice-enlarged image. In other words, the R pixel value, G pixel value and B pixel value of pixel $P_{ENL2}(2i-1, 2j-1)$ of the twice-enlarged image are determined in accordance with the following expressions (4a) to (4c):

$$R_{ENL2}(2i-1, 2j-1)=R_{IN}(i, j), \quad (4a)$$

$$G_{ENL2}(2i-1, 2j-1)=G_{IN}(i, j), \text{ and} \quad (4b)$$

$$B_{ENL2}(2i-1, 2j-1)=B_{IN}(i, j). \quad (4c)$$

The pixel values of the horizontal interpolation pixel positioned in the i-th row and the j-th column of the array of the horizontal interpolation pixels of the interpolated image are used as the pixel values of pixel $P_{ENL2}(2i-1, 2j)$ positioned in the (2i−1)-th row and the 2j-th column of the twice-enlarged image. In other words, the R pixel value, G pixel value and B pixel value of pixel $P_{ENL2}(2i-1, 2j)$ of the twice-enlarged image are determined in accordance with the following expressions (5a) to (5c):

$$R_{ENL2}(2i-1, 2j)=R_{INTH}(i, j), \quad (5a)$$

$$G_{ENL2}(2i-1, 2j)=G_{INTH}(i, j), \text{ and} \quad (5b)$$

$$B_{ENL2}(2i-1, 2j)=B_{INTH}(i, j). \quad (5c)$$

Furthermore, the pixel values of the vertical interpolation pixel positioned in the i-th row and the j-th column of the array of the vertical interpolation pixels of the interpolated image are used as the pixel values of pixel $P_{ENL2}(2i, 2j-1)$ positioned in the 2i-th row and the (2j−1)-th column of the twice-enlarged image. In other words, the R pixel value, G pixel value and B pixel value of pixel $P_{ENL2}(2i, 2j-1)$ of the twice-enlarged image are determined in accordance with the following expressions (6a) to (6c):

$$R_{ENL2}(2i, 2j-1)=R_{INTV}(i, j), \quad (6a)$$

$$G_{ENL2}(2i, 2j-1)=G_{INTV}(i, j), \text{and} \quad (6b)$$

$$B_{ENL2}(2i, 2j-1)=B_{INTV}(i, j). \quad (6c)$$

Finally, the pixel values of the pixel positioned in the i-th row and the j-th column of the intermediate pixel image are used as the pixel values of pixel $P_{ENL2}(2i, 2j)$ positioned in the 2i-th row and the 2j-th column of the twice-enlarged image. In other words, the R pixel value, G pixel value and B pixel value of pixel $P_{ENL2}(2i, 2j)$ of the twice-enlarged image are determined in accordance with the following expressions (7a) to (7c):

$$R_{ENL2}(2i, 2j) = R_{CTR}(i, j), \tag{7a}$$

$$G_{ENL2}(2i, 2j) = G_{CTR}(i, j), \text{ and} \tag{7b}$$

$$B_{ENL2}(2i, 2j) = B_{CTR}(i, j). \tag{7c}$$

The twice-enlarged image data $D_{ENL2}$ are generated as data describing the R, G and B pixel values determined as described above of the respective pixels of the twice-enlarged image.

It should be noted that the R pixel value $R_{CTR}(i, j)$ of each pixel of the intermediate pixel image is calculated as the average value of selected two of the four R pixel values of the pixels of the corresponding 2×2 pixel array other than the maximum and minimum values of the four R pixel values (not as the average value of the four R pixel values). The same goes for the G pixel value $G_{CTR}(i, j)$ and B pixel value $B_{CTR}(i, j)$ of each pixel of the intermediate pixel image. The G pixel value $G_{CTR}(i, j)$ of each pixel of the intermediate pixel image is calculated as the average value of selected two of the four G pixel values of the pixels of the corresponding 2×2 pixel array other than the maximum and minimum values of the four G pixel values (not as the average value of the four G pixel values), and the B pixel value $B_{CTR}(i, j)$ of each pixel of the intermediate pixel image is calculated as the average value of selected two of the four B pixel values of the pixels of the corresponding 2×2 pixel array other than the maximum and minimum values of the four B pixel values (not as the average value of the four B pixel values).

Such calculation effectively avoid a diagonal edge being represented as a stepwise line in the twice-enlarged image and resultingly avoids a diagonal edge being represented as a stepwise line also in the α-times enlarged image, which is obtained from the twice-enlarged image. Discussed below is the case when there is a diagonal edge in an array of pixels $P_{IN}(i, j)$, $P_{IN}(i, j+1)$, $P_{IN}(i+1, j)$ and $P_{IN}(i+1, j+1)$ where the R, G and B pixel values of pixels $P_{IN}(i, j)$, $P_{IN}(i, j+1)$ and $P_{IN}(i+1, j)$ are all "255" and the R, G and B pixel values of pixel $P_{IN}(i+1, j+1)$ are all "0". Note that the pixel values of pixel $P_{CTR}(i, j)$ of the intermediate pixel image are calculated from the pixel values of pixels $P_{IN}(i, j)$, $P_{IN}(i, j+1)$, $P_{IN}(i+1, j)$ and $P_{IN}(i+1, j+1)$ as described above.

Figure 7A:
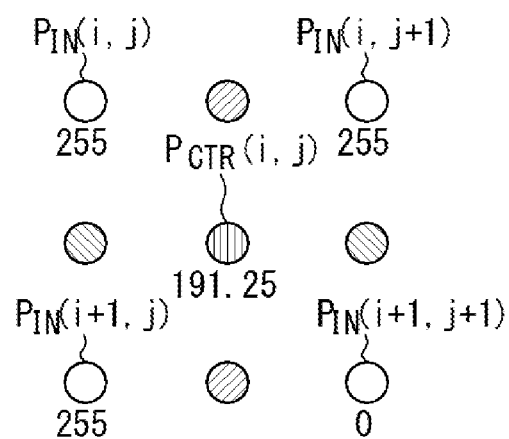
FIG. 7A partially illustrates the twice-enlarged image in the case when a pixel value of pixel $P_{CTR}(i, j)$ of an intermediate pixel image is calculated as the average value of the pixel values of pixels $P_{IN}(i, j)$, $P_{IN}(i, j+1)$, $P_{IN}(i+1, 1)$ and $P_{IN}(i+1, j+1)$.

In this case, the R, G and B pixel values of pixel $P_{CTR}(i, j)$ are calculated as 191.25, if the R, G and B pixel values of pixel $P_{CTR}(i, j)$ of the intermediate pixel image are respectively calculated as the average values of those of pixels $P_{IN}(i, j)$, $P_{IN}(i, j+1)$, $P_{IN}(i+1, j)$ and $P_{IN}(i+1, j+1)$ as illustrated in FIG. 7A. This results in changes in the pixel values along the diagonal array of pixels $P_{IN}(i+1, j)$, $P_{CTR}(i, j)$ and $P_{IN}(i+1, j)$, causing a blur at the diagonal edge.

Figure 7B:
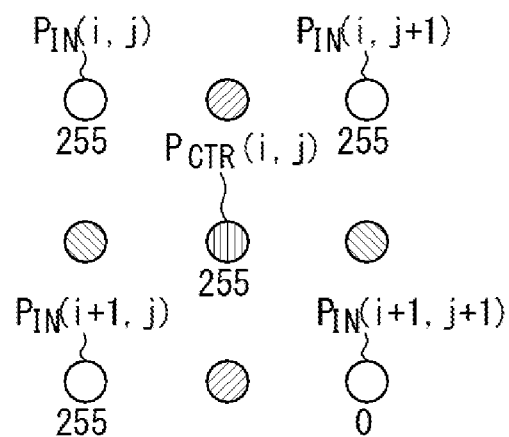
FIG. 7B partially illustrates the twice-enlarged image in the case when a pixel value of pixel $P_{CTR}(i, j)$ of an intermediate pixel image is calculated as the average value of two of the pixel values of pixels $P_{IN}(i, j)$, $P_{IN}(i, j+1)$, $P_{IN}(i+1, j)$ and $P_{IN}(i+1, j+1)$ other than the maximum and minimum values.

On the other hand, as illustrated in FIG. 7B, The R, G and B pixel values of pixel $P_{CTR}(i, j)$ are calculated as 255, if the R, G and B pixel values of pixel $P_{CTR}(i, j)$ of the intermediate pixel image are respectively calculated as the average values of selected two of the R, G and B pixel values of pixels $P_{IN}(i, j)$, $P_{IN}(i, j+1)$, $P_{IN}(i+1, j)$ and $P_{IN}(i+1, j+1)$ other than the maximum and minimum values thereof as illustrated in FIG. 7B, and this effectively suppresses generation of a blur at the diagonal edge.

As illustrated in FIG. 3, an α-times enlarged image is generated through interpolation processing from the twice-enlarged image obtained as described above (at step S04). In other words, the α-times enlarged image data $D_{ENL\alpha}$ are calculated from the twice-enlarged image data $D_{ENL2}$. It should be noted that, when the number of pixels arrayed in the horizontal direction of the input image is H and the number of pixels arrayed in the vertical direction of the input image is V, αH pixels are arrayed in the horizontal direction of the α-times enlarged image and αV pixels are arrayed in the vertical direction of the α-times enlarged image. Accordingly, the R, G and B pixel values of each of the αH×αV pixels are calculated in the calculation of the α-times enlarged image data $D_{ENL\alpha}$.

Figure 8:
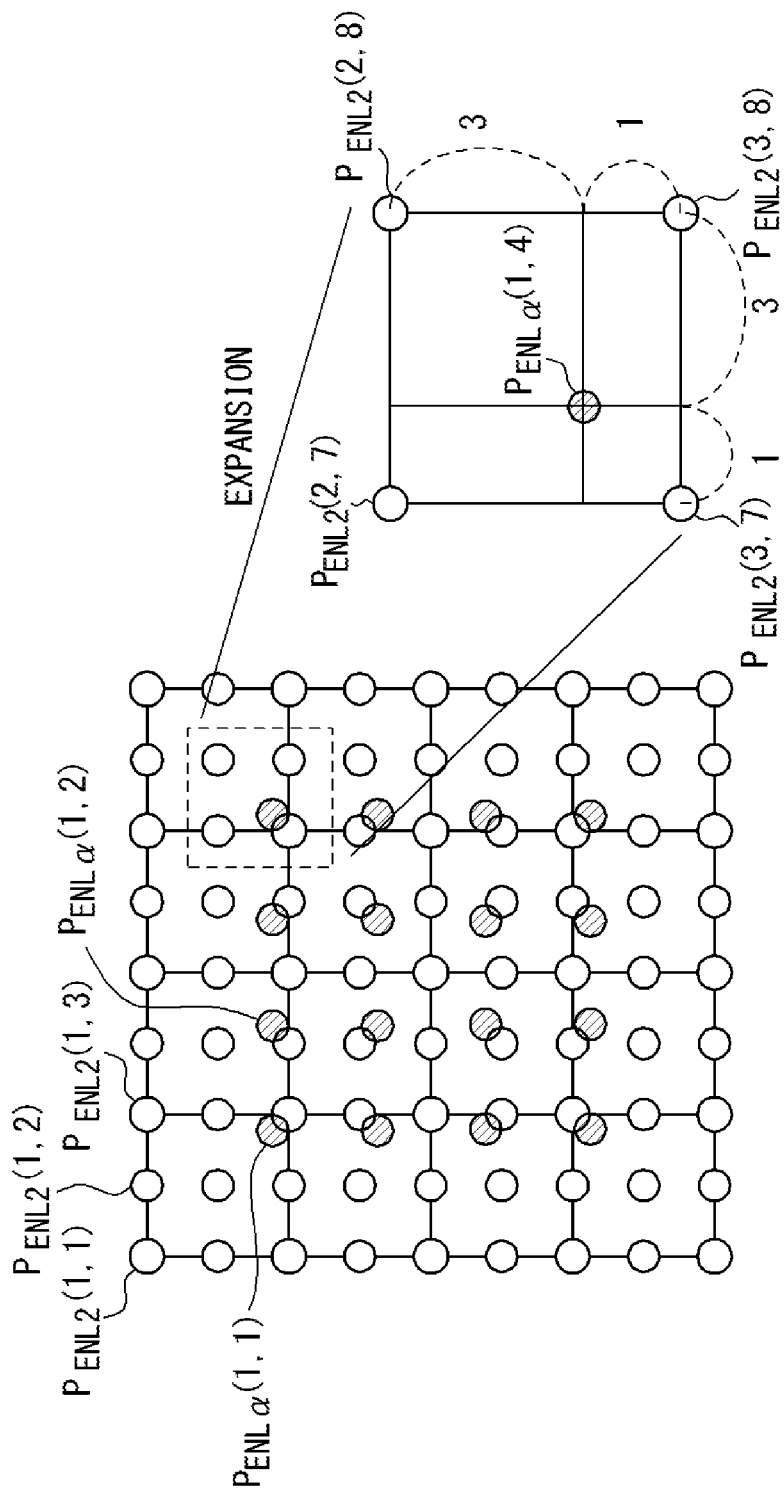
FIG. 8 conceptually illustrates a method of generating α-times enlarged image from a twice-enlarged image.

FIG. 8 conceptually illustrates the method for generating an α-times enlarged image from a twice-enlarged image. In calculating the pixel values of a target pixel of the α-times enlarged image, pixels of the twice-enlarged image corresponding to the target pixel of the α-times enlarged image are first selected. It should be noted that multiple pixels of the twice-enlarged image are selected for the target pixel of the α-times enlarged image.

In selection of multiple pixels of the twice-enlarged image corresponding to a target pixel of the α-times enlarged image, the position of the target pixel in the twice-enlarged image is first determined. When the numbers of pixels arrayed in the horizontal and vertical directions of the input image are H and V, respectively, αH pixels are arrayed in the horizontal direction of the α-times enlarged image and αV pixels are arrayed in the vertical direction of the α-times enlarged image, while 2H pixels are arrayed in the horizontal direction of the twice-enlarged image and 2V pixels are arrayed in the vertical direction of the twice-enlarged image. One pixel is disposed in the α-times enlarged image for every (2/α) pixels of the twice-enlarge image, with respect to both of the horizontal and vertical directions. The corresponding position in the twice-enlarged image of each pixel of the α-times enlarged image can be determined on the basis of this relation.

Furthermore, multiple pixels close to the target pixel of the α-times enlarged image are selected from the pixels of the twice-enlarged image and the pixel values of the target pixel of the α-times enlarged image are calculated through interpolation processing of the pixel values of the selected pixels of the twice-enlarged image. This interpolation processing may be achieved by commonly-used interpolation processing, such as bilinear interpolation or bicubic interpolation.

When bilinear interpolation is used, for example, the R pixel value $R_{ENL\alpha}(i, j)$, G pixel value $G_{ENL\alpha}(i, j)$ and B pixel value $B_{ENL\alpha}(i, j)$ of pixel $P_{ENL\alpha}(i, j)$ of the α-times enlarged image are calculated in accordance with the following expressions (8a) to (8c):

$$R_{ENL\alpha}(i, j) = ( [y]+1-[y] \quad y-[y] ) \tag{8a}$$
$$\begin{pmatrix} R_{ENL2}([x], [y]) & R_{ENL2}([x]+1, [y]) \\ R_{ENL2}([x], [y]+1) & R_{ENL2}([x]+1, [y]+1) \end{pmatrix} \begin{pmatrix} [x]+1-x \\ x-[x] \end{pmatrix}$$

$$G_{ENL\alpha}(i, j) = ( [y]+1-[y] \quad y-[y] ) \tag{8b}$$
$$\begin{pmatrix} G_{ENL2}([x], [y]) & G_{ENL2}([x]+1, [y]) \\ G_{ENL2}([x], [y]+1) & G_{ENL2}([x]+1, [y]+1) \end{pmatrix} \begin{pmatrix} [x]+1-x \\ x-[x] \end{pmatrix}$$

$$B_{ENL\alpha}(i, j) = ( [y]+1-[y] \quad y-[y] ) \tag{8c}$$
$$\begin{pmatrix} B_{ENL2}([x], [y]) & B_{ENL2}([x]+1, [y]) \\ B_{ENL2}([x], [y]+1) & B_{ENL2}([x]+1, [y]+1) \end{pmatrix} \begin{pmatrix} [x]+1-x \\ x-[x] \end{pmatrix}$$

where (x, y) denotes the position in the twice-enlarged image of pixel $P_{ENL\alpha}(i, j)$ positioned in the i-th row and the j-th column of the α-times enlarged image, [x] is the greatest integer that does not exceed x, and [y] is the greatest integer that does not exceed y.

Illustrated in FIG. 8 is an example in which the pixel values of pixel $P_{ENL\alpha}(1, 4)$ of the α-times enlarged image are calculated through interpolation processing of the pixel values of pixels $P_{ENL2}(2, 7)$, $P_{ENL2}(2, 8)$, $P_{ENL2}(3, 7)$ and $P_{ENL2}(3, 8)$ of the twice-enlarged image. In this example, interpolation processing is performed in accordance with expressions (8a) to (8c) under the conditions that x−[x] is 0.25 (=¼) and y−[y] is 0.75 (=¾).

The α-times enlarged image data $D_{ENL\alpha}$ are calculated by performing the above-described interpolation processing for each pixel of the α-times enlarged image. The α-times enlarged image data $D_{ENL\alpha}$ are generated as data describing the R, G and B pixel values of each pixel of the α-times enlarged image, calculated as described above.

The generation of the α-times enlarged image (that is, the α-times enlarged image data $D_{ENL\alpha}$) through the above-described method effectively suppresses generation of blurs at diagonal edges in the α-times enlarged image.

Figure 9:
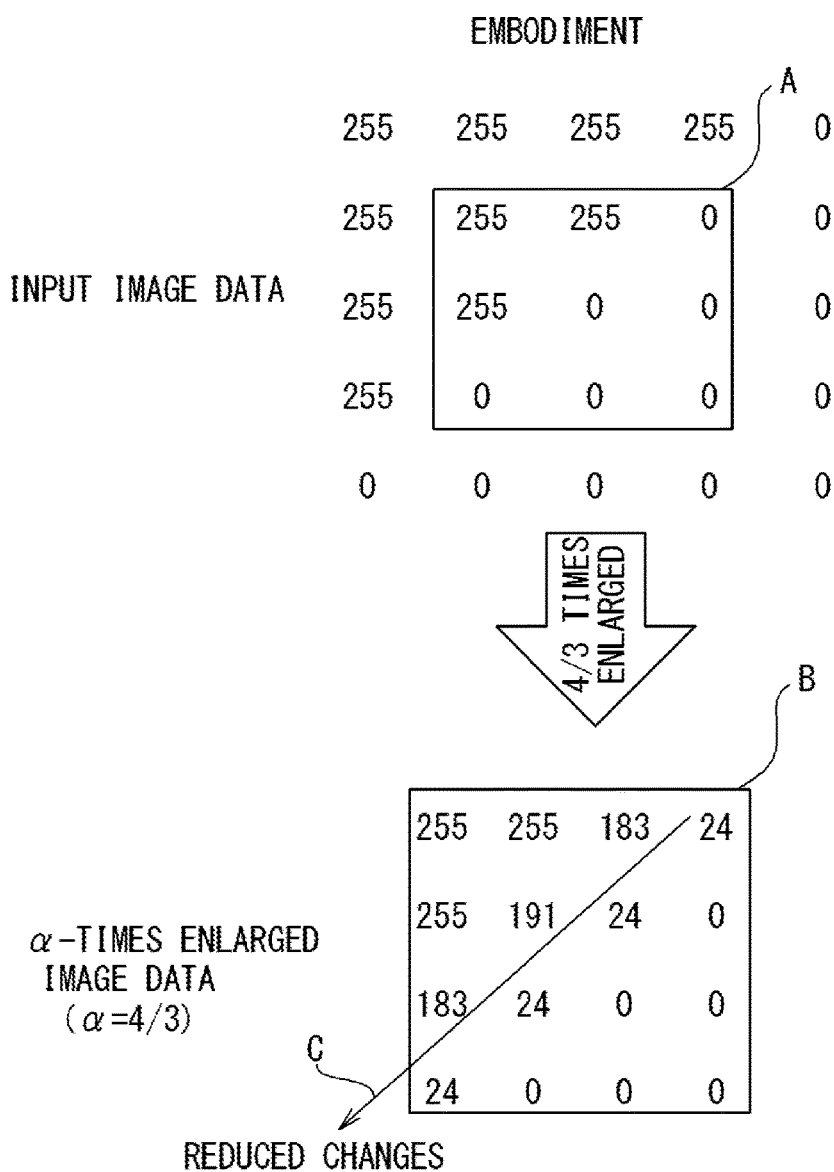
FIG. 9 illustrates 4/3-times enlarged image data generated through image enlargement processing of the present embodiment.
Figure 10:
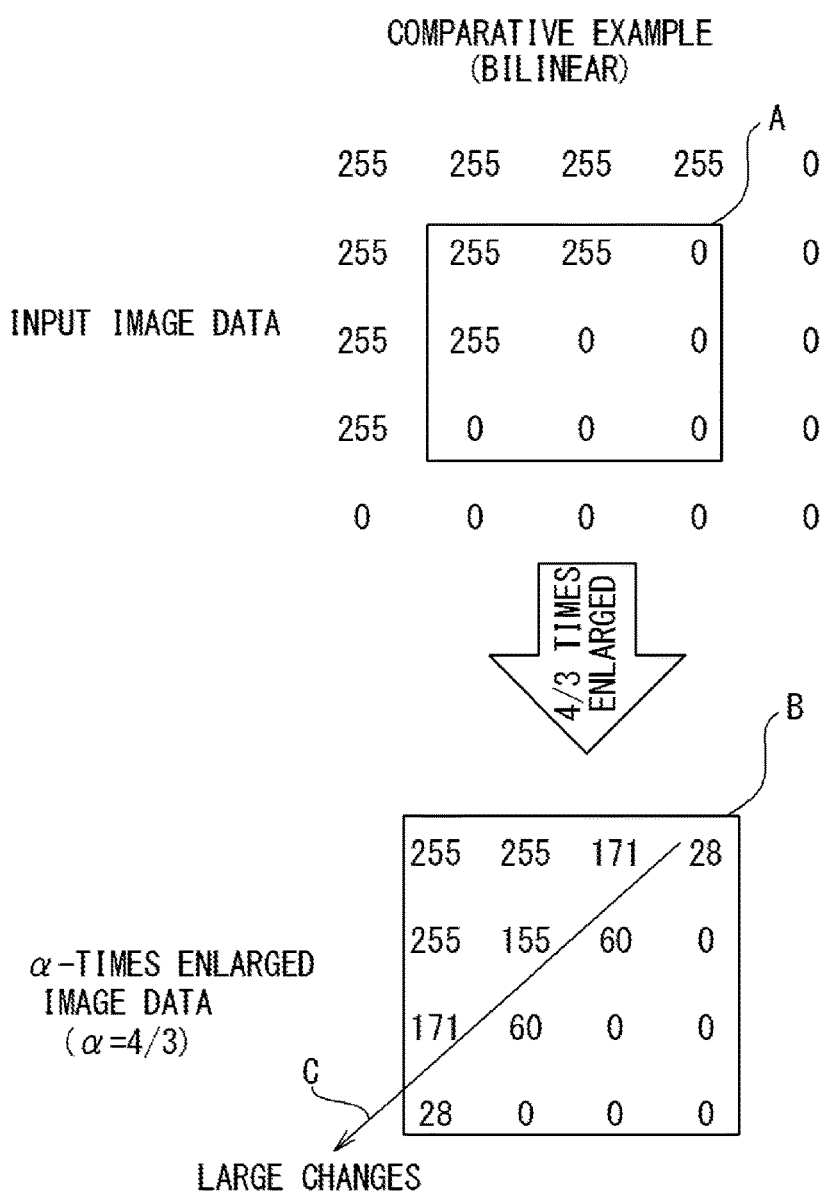
FIG. 10 illustrates 4/3-times enlarged image data generated through bilinear interpolation known in the art.

FIGS. 9 and 10 are conceptual diagrams specifically illustrating an advantage of the image enlargement processing of the present embodiment. FIG. 9 illustrates generation of a 4/3-times enlarged image through the image enlargement processing of the present embodiment, and FIG. 10 illustrates generation of a 4/3-times enlarged image through a commonly-known bilinear interpolation. It should be noted that the R, G, and B pixel values of each pixel of the input image are assumed as being equal to each other in the examples illustrated in FIGS. 9 and 10. The numeric values described in the rectangular B indicate the pixel values of 4×4 pixels of the 4/3-times enlarged image obtained through image enlargement processing on 3×3 pixels of the input image indicated in the rectangular A in FIGS. 9 and 10 with an enlargement factor of 4/3

As illustrated in FIG. 10, when a 4/3-times enlarged image is generated through a commonly-known bilinear interpolation, the changes in the pixel values in the direction along the edge (the direction along the arrow C in FIG. 10) are increased. This implies that a blur is generated at the diagonal edge. When a 4/3-times enlarged image is generated through the image enlargement processing of the present embodiment, in contrary, the changes in the pixel values in the direction along the edge (the direction along the arrow C in FIG. 9) are reduced as illustrated in FIG. 9. This implies that generation of a blur at the diagonal edge is suppressed.

As thus discussed, the image enlargement processing of the present embodiment effectively allows generating α-times enlarged image with reduced blurs at diagonal edges.

Although the above-described embodiment recites the case when the enlargement factor α is less than two, the similar applies to the case when the enlargement factor α is more than two; in the case when the enlargement factor α is more than two, an α-times enlarged image can be generated with reduced blurs at diagonal edges through generating a $2^n$-times enlarged image by enlarging an input image with an enlargement factor of $2^n$ (n is the minimum natural number determined so that $2^n$ is larger than α) and calculating the pixel values of a respective one of the pixels of the α-times enlarged image through interpolation processing of the pixel values of the multiple pixels of the $2^n$-times enlarged image corresponding to the respective one pixel of the α-times enlarged image. Note that a $2^j$-times enlarged image can be obtained by applying the above-described generation method of the twice-enlarged image to a $2^{j-1}$-times enlarged image (where j is an integer from one to n). For example, a four-times enlarged image can be obtained by applying the above-described generation method of the twice-enlarged image to the twice-enlarged image again and a $2^n$-times enlarged image can be obtained in a similar way for an arbitrary integer n.

This calculation can be easily achieved by serially connecting n twice-enlarged image generator circuits 21. In one embodiment, $2^n$-times enlarged image data corresponding to a $2^n$-times enlarged image may be generated with first to n-th twice-enlarged image generator circuits, each configured identically to the above-described twice-enlarged image generator circuit 23. In this case, the first twice-enlarged image generator circuit generates twice-enlarged image data corresponding to the twice-enlarged image, which is an enlargement of the input image with an enlargement factor of two, from the input image data $D_{IN}$. The p-th twice-enlarged image generator circuit (where p is an integer from two to n) generates $2^p$-times enlarged image data corresponding to the $2^p$-times enlarged image by performing image enlargement processing on $2^{p-1}$-times enlarged image data corresponding to the $2^{p-1}$-times enlarged image. The intermediate pixel image generator circuit 23 of the q-th twice-enlarged image generator circuit of the first to n-th twice-enlarged image generator circuits (where q is an integer from one to n) generates intermediate pixel image data corresponding to an intermediate pixel image composed of intermediate pixels respectively corresponding to 2×2 pixel arrays included in the input image or $2^{q-1}$-times enlarged image and the interpolated image generator circuit 24 of the q-th twice-enlarged image generator circuit generates interpolated image data corresponding to an interpolated image composed of interpolation pixels respectively corresponding to combinations of two pixels adjacent in the horizontal or vertical direction of the input image or $2^{q-1}$-times enlarged image. The twice-enlarged image data $D_{ENL2}$ generated by the first twice-enlarged image generator circuit include the input image data $D_{IN}$, the intermediate pixel image data generated by the intermediate pixel image generator circuit 23 of the first twice-enlarged image generator circuit, and the interpolated image data generated by the interpolated image generator circuit 24 of the first twice-enlarged image generator circuit. Similarly, the $2^p$-times enlarged image data generated by the p-th twice-enlarged image generator circuit include the $2^{p-1}$-times enlarged image data, the intermediate pixel image data generated by the intermediate pixel image generator circuit 23 of the p-th twice-enlarged image generator circuit, and the interpolated image data generated by the interpolated image generator circuit 24 of the p-th twice-enlarged image generator circuit. The $2^n$-times enlarged image data corresponding to the $2^n$-times enlarged image are output from the n-th twice-enlarged image data generator circuit.

Since the above-described generation method of the twice-enlarged image effectively suppress the generation of blurs at diagonal edges, generation of blurs at diagonal edges are suppressed also in the $2^n$-times enlarged image, which is obtained by repeating the above-described generation method of the twice-enlarged image n times.

FIG. 11 is a block diagram illustrating an exemplary configuration of a scaler circuit 15 adapted to an enlargement factor α larger than one and less than four. The scaler circuit 15 illustrated in FIG. 11 includes two serially-connected twice-enlarged image generator circuits $21_1$ and $21_2$. The twice-enlarged image generator circuits $21_1$ and $21_2$, which are configured similarly to the twice-enlarged image generator circuit 21 illustrated in FIG. 2, each include an intermediate pixel image generator circuit 23 and an interpolated image generator circuit 24. Each of the twice-enlarged image generator circuits 21₁ and 21₂ performs the above-described image enlargement processing on image data fed thereto with an enlargement factor of two. The twice-enlarged image generator circuit 21₁ generates twice-enlarged image data $D_{ENL2}$ from the input image data $D_{IN}$ and the twice-enlarged image generator circuit 21₂ generates four-times enlarged image data $D_{ENL4}$ corresponding to an four-times enlarged image from the twice-enlarged image data $D_{ENL2}$.

The α-times enlarged image generator circuit 22 generates α-times enlarged image data $D_{ENL\alpha}$ from the twice-enlarged image data $D_{ENL2}$ or the four-times enlarged image data $D_{ENL4}$. In detail, when the enlargement factor α is less than two, the α-times enlarged image data $D_{ENL\alpha}$ are generated through interpolation processing of the twice-enlarged image data $D_{ENL2}$ in the same way as described above. When the enlargement factor α is more than two and less than four, the α-times enlarged image data $D_{ENL\alpha}$ are generated through interpolation processing of the four-times enlarged image data $D_{ENL4}$. More specifically, pixels of the four-times enlarged image corresponding to each pixel of the α-times enlarged image are first selected. In selecting pixels of the four-times enlarged image corresponding to a target pixel of the α-times enlarged image, the position of the target pixel in the four-times enlarged image is first determined. This is followed by selecting pixels close to the position of the target pixel from the pixels of the four-times enlarged image, and then the pixel values of the target pixel of the α-times enlarged image are calculated through interpolation processing of the pixel values of the selected pixels of the four-times enlarged image. Commonly-used interpolation processing, such as bilinear interpolation or bicubic interpolation, may be used in this interpolation processing.

The above-described method is applicable to the case when the enlargement factor α is an integer which cannot be represented as $2^k$ for any natural number k (for example, three), as well as the case when the enlargement factor α is a non-integer number. For example, the above-described method is applicable to the case when the enlargement factor α is three. For an enlargement factor α of three, the α-times enlarged image generator circuit 22 may generate α-times enlarged image data $D_{ENL\alpha}$ through interpolation processing of the four-times enlarged image data $D_{ENL4}$. The image enlargement processing of this embodiment effectively suppresses generation of blurs at diagonal edges also in the case when the enlargement factor α is an integer which cannot be represented as $2^k$ for any natural number k (for example, three).

The α-times enlarged image data $D_{ENL\alpha}$ can be obtained in a similar manner also in the case when the enlargement factor α is larger than four. To obtain an α-times enlarged image (α is a number larger than one which cannot be represented as $2^k$ for k being a natural number), a $2^n$-times enlarged image is first generated by enlarging the input image with an enlargement factor of $2^n$ (n is the smallest integer determined so that $2^n$ is larger than α) and the pixel values of each pixel of the α-times enlarged image are calculated through interpolation processing of the pixel values of pixels of the $2^n$-times enlarged image corresponding to each pixel of the α-times enlarged image.

It should be noted that, since twice-enlarged image data $D_{ENL2}$ corresponding to a twice-enlarged image are generated to incorporate data indicating the pixel values of all the pixels of an input image data (that is, input image data $D_{IN}$) when the twice-enlarged image is generated through the above-described method, a $2^N$-times enlarged image data corresponding to $2^N$-times enlarged image (N is an natural number) includes the pixel values of the pixels of all of a $2^0$-times enlarged image (that is, the input image), a $2^1$-times enlarged image (that is, twice-enlarged image), . . . , and $2^{(N-1)}$-times enlarged image. Accordingly, α-times enlarged image data corresponding to an α-times enlarged image for an arbitrary α being less than $2^N$ can be generated from $2^N$-enlarged image data corresponding to a $2^N$-enlarged image data through extracting $2^n$-times enlarged image data corresponding to the $2^n$-times enlarged image (n is the smallest natural number equal to or less than N determined so that $2^n$ is larger than α) from the $2^N$-times enlarged image data and performing interpolation processing on the $2^n$-times enlarged image data.

(Edge Enhancement Processing)

It is known in the art that blurs of edges are often observed in an enlarged image obtained through image enlargement processing. Accordingly, as illustrated in FIG. 12, it is preferable that edge enhancement processing is performed on α-times enlarged image data and the liquid crystal driver 3 of the present embodiment incorporates the edge enhancement circuit 16 to achieve edge enhancement processing as illustrated in FIG. 1. The edge enhancement circuit 16 performs edge enhancement processing on the α-times enlarged image data $D_{ENL\alpha}$ received from the scaler circuit 15 to generate the output image data $D_{OUT}$ to be fed to the source line driver circuit 14. The output image data $D_{OUT}$ are used to drive the source lines of the liquid crystal display panel 2.

Figure 13A:
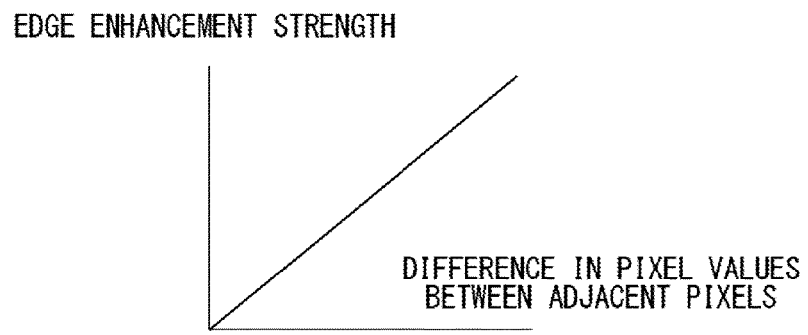
FIG. 13A is a graph illustrating the relation of the difference in the pixel value between adjacent pixels with the edge enhancement strength in commonly-used edge enhancement processing.

In most typical edge enhancement processing, as illustrated in FIG. 13A, edge enhancement is performed with an edge enhancement strength determined as being proportional to the difference in the pixel value between adjacent pixels. For example, matrix filtering with a matrix $M_1$ given below achieves edge enhancement with an edge enhancement strength determined as being proportional to the difference in the pixel value between adjacent pixels:

$$M_1 = \begin{pmatrix} 0 & -1 & 0 \\ -1 & 5 & -1 \\ 0 & -1 & 0 \end{pmatrix} \quad (9)$$

Such edge enhancement processing, however, undesirably causes a flicker when the enlargement factor α is non-integer and the enlarged image is scrolled. FIG. 13B conceptually illustrates the problem of the flicker generated when the enlarged image is scrolled, for a non-integer enlargement factor α.

The problem of generation of a flicker results from the fact that the non-integer enlargement factor α causes a change in the thickness of an edge depending on the position. Referring to FIG. 13B, discussed below is an example of the input image in which pixels for which the R, G and B pixel values are all "0" are arrayed in the vertical direction in a region where pixels for which the R, G and B pixel values are all "255" are arrayed in rows and columns (refer to the left column of FIG. 13B). The center column of FIG. 13B illustrates the pixel values of each pixel of an enlarged image obtained by performing 4/3-times image enlargement processing on the above-described input image and the right column illustrates the pixel values of each pixel of the image obtained by further performing edge enhancement processing. It should be noted only one pixel value is illustrated for each pixel in FIG. 13B, because the R, G and B pixel values are the same in each pixel. The portion in which the pixels for which the R, G and B pixel values are all "0" are arrayed in the vertical direction is observed as a vertical line in the display screen.

When the enlargement factor α is non-integer (in FIG. 13B, α is 4/3), although the average value of the pixel values of the pixels in the portion corresponding to the vertical line is unchanged before and after the scroll, the pixel values of the pixels of each column vary due to the scroll. In this case, edge enhancement processing is performed with different edge enhancement strengths and this undesirably causes changes in the average value of the pixel values of the pixels in the portion corresponding to the vertical line between before and after the scroll. As a result, changes in the brightness of the portion corresponding to the vertical line are observed when scrolling is successively performed, and this causes a flicker.

Figure 14A:
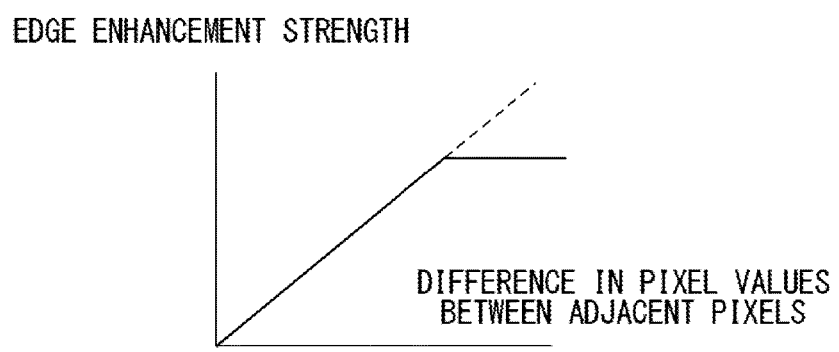
FIG. 14A is a graph illustrating the relation of the difference in the pixel value between adjacent pixels with the edge enhancement strength in edge enhancement processing in the present embodiment.

To suppress generation of this type of flicker, limiting processing to limit the edge enhancement strength is performed in the present embodiment as illustrated in FIG. 14A. More specifically, in calculating a pixel value of a target pixel in edge enhancement processing, an edge enhancement strength is calculated on the basis of the difference in the pixel value between the target pixel and adjacent pixels and limiting processing is further performed to limit the absolute value of the edge enhancement strength. The edge enhancement processing is performed with the edge enhancement strength obtained by the limiting processing.

More specifically, the difference in the pixel value of the target pixel and adjacent pixels is calculated for each of the R, G and B pixel values. In the present embodiment, the difference in the pixel value between the target pixel and the pixels adjacent to the target pixel in the vertical and horizontal directions is calculated by using a matrix $M_2$ defined as follows:

$$M_2 = \begin{pmatrix} 0 & -1 & 0 \\ -1 & 4 & -1 \\ 0 & -1 & 0 \end{pmatrix} \quad (10)$$

For example, discussed below is the case when the R pixel values of 3×3 pixels that include the target pixel and the pixels adjacent to the target pixel are given by the following matrix (11); note that the R pixel value of the target pixel is indicated by the element positioned in the second row and the second column:

$$\begin{pmatrix} 255 & 96 & 96 \\ 255 & 96 & 96 \\ 255 & 96 & 96 \end{pmatrix} \quad (11)$$

In this case, the difference $\Delta_R$ in the R pixel value is given by the following expression:

$$\Delta_R = 96 \times 4 - 255 - 96 - 96 - 96 = -159.$$

The difference $\Delta_G$ in the G pixel value between the target pixel and adjacent pixels and the difference $\Delta_B$ in the B pixel value between the target pixel and the adjacent pixels are also calculated in a similar manner.

An edge enhancement strength is further calculated on the basis of the difference in the pixel value between the target pixel and the adjacent pixels. In the present embodiment, an edge enhancement strength is calculated for each of the R, G and B pixel values. More specifically, an edge enhancement strength $W_R$ for the R pixel value is calculated on the basis of the difference $\Delta_R$. Similarly, the edge enhancement strength $W_G$ and $W_B$ for the G and B pixel values are calculated on the basis of the differences $\Delta_G$ and $\Delta_B$, respectively. In the present embodiment, the values of the differences $\Delta_R$, $\Delta_G$ and $\Delta_B$ are used as the edge enhancement strengths $W_R$, $W_G$ and $W_B$, respectively, without changes. Therefore, the following holds:

$$W_R = \Delta_R$$

$$W_G = \Delta_G, \text{ and}$$

$$W_B = \Delta_B. \quad (12)$$

In an alternative embodiment, the edge enhancement strengths $W_R$, $W_G$ and $W_B$ may be determined by performing an operation on the difference $\Delta_R$, $\Delta_G$ and $\Delta_B$, respectively.

This is followed by performing limiting processing to limit each edge enhancement strength so that the absolute value of the edge enhancement strength does not exceed a certain limit value $W_{TH}$ (>0). In the present embodiment, the limiting processing is performed for each of the R, G and B pixel values. More specifically, the edge enhancement strength $W_{R-LMT}$ for the R pixel value is determined by the limiting processing as follows:

$$W_{R-LMT} = W_{TH} \text{ (for } W_R > W_{TH}\text{)},$$

$$W_{R-LMT} = W_R \text{ (for } -W_{TH} < W_R < W_{TH}\text{), and}$$

$$W_{R-LMT} = -W_{TH} \text{ (for } W_R < -W_{TH}\text{)}. \quad (13a)$$

The similar goes for the G and B pixel values. The edge enhancement strengths $W_{G-LMT}$ and $W_{B-LMT}$ for the G and B pixel values are determined by the limiting processing as follows:

$$W_{G-LMT} = W_{TH} \text{ (for } W_G > W_{TH}\text{)},$$

$$W_{G-LMT} = W_G \text{ (for } -W_{TH} < W_G < W_{TH}\text{)},$$

$$W_{G-LMT} = -W_{TH} \text{ (for } W_G < -W_{TH}\text{)}, \quad (13b)$$

$$W_{B-LMT} = W_{TH} \text{ (for } W_B > W_{TH}\text{)},$$

$$W_{B-LMT} = W_B \text{ (for } -W_{TH} < W_B < W_{TH}\text{), and}$$

$$W_{B-LMT} = -W_{TH} \text{ (for } W_B < -W_{TH}\text{)}. \quad (13c)$$

In the edge enhancement processing, a pixel value of the target pixel is obtained by correcting the original pixel value of the target pixel on the basis of the edge enhancement strength obtained by the limiting processing. In the present embodiment, the R, G and B pixel values $R_{OUT}$, $G_{OUT}$ and $B_{OUT}$ are calculated for the target pixel in the edge enhancement processing in accordance with the following expressions (14a) to (14c):

$$R_{OUT} = R_{ENL\alpha} - \beta \cdot W_{R-LMT}, \quad (14a)$$

$$G_{OUT} = G_{ENL\alpha} - \beta \cdot W_{G-LMT}, \text{ and} \quad (14b)$$

$$B_{OUT} = B_{ENL\alpha} - \beta \cdot W_{B-LMT}, \quad (14c)$$

where $R_{ENL\alpha}$, $G_{ENL\alpha}$ and $B_{ENL\alpha}$ are the original R, G and B pixel values of the target pixel (that is, the R, G and B pixel values of the target pixel in the α-times enlarged image) and β is a predetermined edge enhancement coefficient.

For example, when the limit value $W_{TH}$ is 63, the edge enhancement coefficient β is 0.5 and the R pixel values of the 3×3 pixels composed of the target pixel and the pixels adjacent to the target pixel are given by expression (11), the difference $\Delta_R$, that is, the edge enhancement strength $W_R$ is calculated as −195, and the R pixel value $R_{OUT}$ of the target pixel is calculated in the edge enhancement processing as follows:

$$R_{OUT}=96-0.5\times(-63)=64.5.$$

FIG. 14B is a table illustrating the effectiveness of the edge enhancement processing of the present embodiment. Discussed below is the image processing of an input image in which pixels for which the R, G and B pixel values are all "0" are arrayed in the vertical direction in a region where pixels for which the R, G and B pixel values are all "255" are arrayed in rows and columns, as is the case with FIG. 13B (refer to the left column of FIG. 14B). The portion in which the pixels for which the R, G and B pixel values are all "0" are arrayed in the vertical direction is observed as a vertical line in the display screen. The center column of FIG. 14B illustrates the pixel values of each pixel of an enlarged image obtained by performing 4/3-times image enlargement processing on the above-described input image and the right column illustrates the pixel values of each pixel of the image obtained by further performing edge enhancement processing. In the edge enhancement processing, the limit value $W_{TH}$ is set to 63 and the edge enhancement coefficient β is set to 0.5. The edge enhancement strengths $W_R$, $W_G$ and $W_B$ (which are not yet subjected to the limiting processing) are determined as being equal to the differences $\Delta_R$, $\Delta_G$ and $\Delta_B$ calculated by the matrix $M_2$ given by expression (10). It should be noted only one pixel value is illustrated for each pixel in FIG. 14B, because the R, G and B pixel values are the same in each pixel.

As described above with reference to FIG. 13B, when edge enhancement processing is performed on an enlarged image obtained by image enlargement processing with a non-integer enlargement factor α with an edge enhancement strength proportional to the difference in the pixel value between the target pixel and adjacent pixels, this undesirably causes changes in the average value of the pixel values of the pixels in the portion corresponding to the vertical line between before and after the scroll. As a result, changes in the brightness of the portion corresponding to the vertical line are observed when scrolling is successively performed, and this causes a flicker.

In the edge enhancement processing of the present embodiment, on the other hand, the changes in the average value of the pixel values of the pixels in the portion corresponding to the vertical line between before and after the scroll are suppressed as illustrated in FIG. 14B, since the edge enhancement strength is limited. As a result, generation of a flicker is also suppressed. As thus discussed, the edge enhancement processing of the present embodiment effectively suppresses generation of a flicker when the enlargement factor α is non-integer and image scrolling is performed.

Although specific embodiments of the present technology are described above, the present technology must not be construed as being limited to the above-described embodiment. It would be apparent to a person skilled in the art that the present technology may be implemented with various modifications. For example, although embodiments of a liquid crystal display device including a liquid crystal display panel are described above, the present technology is applicable to panel display devices including different display panels (such as display devices including OLED (organic light emitting diode) display panels). Although the above-described embodiments recite image processing (including image enlargement processing and edge enhancement processing) performed on image data described in the RGB format, the image processing of the above-described embodiments may be applied to image data in different formats, e.g., YUV format. When input image data in the RGB format are fed, the input image data may be converted into image data in a different format, for example, image data in the YUV format and the image processing of the above-described embodiments may be performed on the image data obtained by the conversion. In an alternative embodiment, when input image data are fed in a format other than the RGB format, the input image data may be converted into image data in the RGB format and the image processing of the above-described embodiments may be performed on the RGB image data obtained by this conversion.

What is claimed is:

1. A display panel driver, comprising:
a scaler circuit configured to enlarge an input image with an enlargement factor of α (α is a number larger than one which cannot be represented as 2k for k being any natural number) to obtain α-times enlarged image data by:
generating an intermediate pixel image composed of intermediate pixels, the intermediate pixels obtained by:
dividing the input image into a plurality of 2×2 pixel arrays having four pixel values; and
selecting an average value of two pixel values of the four pixel values in each of the 2×2 pixel arrays, the two pixel values being other than a maximum and a minimum value of the four pixel values;
calculating an interpolated pixel image composed of interpolated pixels by enlarging the input image with an enlargement factor of 2n (n is the smallest integer determined so that 2n is larger than α) to obtain a 2n-times enlarged image, wherein values of the interpolated pixels are determined by interpolation of pixel values of selected pixels of the 2n-times enlarged image; and
incorporating the input image, the intermediate pixel image, and the interpolated pixel image into the α-times enlarged image;
an edge enhancement circuit configured to generate output image data by performing edge enhancement processing on the α-times enlarged image; and
a driver section configured to drive a display panel at least partially based on the output image data.

2. The display panel driver according to claim 1, wherein the scaler circuit further includes:
a twice-enlarged image generator circuit configured to generate twice-enlarged image data corresponding to a twice-enlarged image obtained by enlarging the input image with an enlargement factor of two; and
an α-times enlarged image generator circuit configured to generate the α-times enlarged image from the twice-enlarged image.

3. The display panel driver according to claim 1, wherein the scaler circuit further includes:
first to n-th twice-enlarged image generator circuits connected in series;
an α-times enlarged image generator circuit,
wherein the first twice-enlarged image generator circuit is configured to generate a $2^1$-times enlarged image data corresponding to a $2^1$-times enlarged image obtained by enlarging the input image with an enlargement factor of two, and wherein the p-th twice-enlarged image generator circuit (p is an integer from two to n) is configured to generate $2^p$-times enlarged image data corresponding to a $2^p$-times enlarged image obtained by enlarging the $2^{(p-1)}$-times enlarged image with an enlargement factor of two;

an intermediate pixel image generator circuit configured to generate intermediate pixel image data corresponding to a second intermediate pixel image composed of second intermediate pixels each corresponding to 2×2 pixel arrays included in the input image or the $2^{(q-1)}$-times enlarged image; and an interpolated image generator circuit configured to generate interpolated image data corresponding to a second interpolated image composed of second interpolation pixels each corresponding to combinations of two pixels of the input image or the $2^{(q-1)}$-times enlarged image adjacent in a horizontal or vertical direction, wherein, in generating the intermediate pixel image data, the intermediate pixel image generator circuit calculates a pixel value of each of the second intermediate pixels as an average value of selected two of pixel values of four pixels of a 2×2 pixel array in the input image or the $2^{(q-1)}$-times enlarged image corresponding to each of the second intermediate pixels, the selected two pixel values being selected other than maximum and minimum values of the pixel values of the four pixels, wherein, in generating the interpolated image data, the interpolated image generator circuit calculates a pixel value of each of the second interpolation pixels as an average value of pixel values of two pixels of a corresponding one of the combinations corresponding to each of the second interpolation pixels, wherein the $2^1$-times enlarged image data generated by the first twice-enlarged image generator circuit incorporate the input image, the intermediate pixel image data generated by the first twice-enlarged image generator circuit and the interpolated image data generated by the first twice-enlarged image generator circuit, and wherein the $2^p$-times enlarged image data generated by the p-th twice-enlarged image generator incorporate the $2^p$-times enlarged image data, the intermediate pixel image data generated by the p-th twice-enlarged image generator circuit and the interpolated image data generated by the p-th twice-enlarged image generator circuit.

4. The display panel driver according to claim 1, wherein, in calculating a pixel value of a second target pixel of the output image data in the edge enhancement processing, the edge enhancement circuit is configured to calculate a first edge enhancement strength based on a difference between a pixel value of the second target pixel and a pixel value of a pixel adjacent to the second target pixel, calculate a second edge enhancement strength by performing limiting processing on the first edge enhancement strength so that an absolute value of the second edge enhancement strength does not exceed a predetermined limit value, and calculate the pixel value of the second target pixel of the output image data by correcting the pixel value of the second target pixel of the α-times enlarged image described in the α-times enlarged image in response to the second edge enhancement strength.

5. A display device, comprising:
a display panel; and
a display panel driver configured to drive the display panel in response to input image data corresponding to an input image,
wherein the display panel driver includes:
a scaler circuit configured to enlarge the input image with an enlargement factor of α (α is a number larger than one which cannot be represented as $2^k$ for k being any natural number) to obtain an α-times enlarged image; and
a driver section configured to drive a display panel in response to the α-times enlarged image, and
wherein the scalar circuit obtains the α-times enlarged image by:
generating an intermediate pixel image composed of intermediate pixels, the intermediate pixels obtained by:
dividing the input image into a plurality of 2×2 pixel arrays having four pixel values;
selecting an average value of two pixel values of the four pixel values in each of the 2×2 pixel arrays, the two pixel values being other than a maximum and a minimum value of the four pixel values;
calculating an interpolated pixel image composed of interpolated pixels by enlarging the input image with an enlargement factor of 2n (n is the smallest integer determined so that 2n is larger than α) to obtain a 2n-times enlarged image, wherein values of the interpolated pixels are determined by interpolation of pixel values of selected pixels of the 2n-times enlarged image; and
incorporating the input image, the intermediate pixel image, and the interpolated pixel image into the α-times enlarged image; and
an edge enhancement circuit configured to generate output image data by performing edge enhancement processing on the α-times enlarged image data,
wherein the driver section is further configured to drive the display panel at least partially based on the output image data.

6. The display device according to claim 5, wherein the scaler circuit includes:
a twice-enlarged image generator circuit configured to generate twice-enlarged image data corresponding to a twice-enlarged image obtained by enlarging the input image with an enlargement factor of two; and
an α-times enlarged image generator circuit configured to generate the α-times enlarged image data from the twice-enlarged image data.

7. The display device according to claim 5, wherein the scaler circuit includes:
first to n-th twice-enlarged image generator circuits connected in series; and
an α-times enlarged image generator circuit,
wherein the first twice-enlarged image generator circuit is configured to generate a $2^1$-times enlarged image data corresponding to a $2^1$-times enlarged image obtained by enlarging the input image with an enlargement factor of two,
wherein the p-th twice-enlarged image generator circuit (p is an integer from two to n) is configured to generate $2^p$-times enlarged image data corresponding to a $2^p$-times enlarged image obtained by enlarging the $2^{(p-1)}$-times enlarged image with an enlargement factor of two, wherein the q-th twice-enlarged image generator circuit of the first to n-th twice-enlarged image generator circuits (q is an integer from one to n) includes:
  an intermediate pixel image generator circuit configured to generate intermediate pixel image data corresponding to a second intermediate pixel image composed of second intermediate pixels each corresponding to 2×2pixel arrays included in the input image or the $2^{(q-1)}$-times enlarged image; and
  an interpolated image generator circuit configured to generate interpolated image data corresponding to a second interpolated image composed of second interpolation pixels each corresponding to combinations of two pixels of the input image or the $2^{(q-1)}$-times enlarged image adjacent in a horizontal or vertical direction,
  wherein, in generating the intermediate pixel image data, the intermediate pixel image generator circuit calculates a pixel value of each of the second intermediate pixels as an average value of two of pixel values of four pixels of a 2×2 pixel array in the input image or the $2^{(q-1)}$-times enlarged image corresponding to each of the second intermediate pixels, the two pixel values being selected other than maximum and minimum values of the pixel values of the four pixels,
  wherein, in generating the interpolated image data, the interpolated image generator circuit calculates a pixel value of each of the second interpolation pixels as an average value of pixel values of two pixels of a corresponding one of the combinations corresponding to each of the second interpolation pixels,
  wherein the $2^1$-times enlarged image data generated by the first twice-enlarged image generator circuit incorporate the input image, the intermediate pixel image data generated by the first twice-enlarged image generator circuit and the interpolated image data generated by the first twice-enlarged image generator circuit, and
  wherein the $2^p$-times enlarged image data generated by the p-th twice-enlarged image generator incorporate the $2^p$-times enlarged image data, the intermediate pixel image data generated by the p-th twice-enlarged image generator circuit and the interpolated image data generated by the p-th twice-enlarged image generator circuit.

8. The display device according to claim 5,
wherein, in calculating a pixel value of a second target pixel of the output image data in the edge enhancement processing, the edge enhancement circuit calculates a first edge enhancement strength based on a difference between a pixel value of the second target pixel and a pixel value of a pixel adjacent to the second target pixel, calculates a second edge enhancement strength by performing limiting processing on the first edge enhancement strength so that an absolute value of the second edge enhancement strength does not exceed a predetermined limit value, and calculates the pixel value of the second target pixel of the output image data by correcting the pixel value of the second target pixel of the α-times enlarged image described in the α-times enlarged image in response to the second edge enhancement strength.

9. An image processing device, comprising:
a scaler circuit configured to enlarge an input image with an enlargement factor of α (α is a number larger than one which cannot be represented as $2^k$ for k being any natural number) to obtain an α-times enlarged image by:
  generating an intermediate pixel image composed of intermediate pixels, the intermediate pixels obtained by:
    dividing the input image into a plurality of 2×2 pixel arrays having four pixel values; and
    selecting an average value of two pixel values of the four pixel values in each of the 2×2 pixel arrays, the two pixel values being other than a maximum and a minimum value of the four pixel values;
  calculating an interpolated pixel image composed of interpolated pixels by enlarging the input image with an enlargement factor of 2n (n is the smallest integer determined so that 2n is larger than α) to obtain a 2n-times enlarged image, wherein values of the interpolated pixels are determined by interpolation of pixel values of selected pixels of the 2n-times enlarged image; and
  incorporating the input image, the intermediate pixel image, and the interpolated pixel image into the α-times enlarged image;
an edge enhancement circuit configured to generate output image data by performing edge enhancement processing on the α-times enlarged image; and
a driver section configured to drive a display panel at least partially based on the output image data.

10. The image processing device according to claim 9,
wherein, in calculating a pixel value of a second target pixel of the output image data in the edge enhancement processing, the edge enhancement circuit calculates a first edge enhancement strength based on a difference between a pixel value of the second target pixel and a pixel value of a pixel adjacent to the second target pixel, calculates a second edge enhancement strength by performing limiting processing on the first edge enhancement strength so that an absolute value of the second edge enhancement strength does not exceed a predetermined limit value, and calculates the pixel value of the second target pixel of the output image data by correcting the pixel value of the second target pixel of the α-times enlarged image described in the α-times enlarged image in response to the second edge enhancement strength.

11. An image processing method for performing image enlargement processing on input image data corresponding to an input image to generate α-times enlarged image data corresponding to an α-times enlarged image obtained by enlarging the input image with an enlargement factor of α (α is a number larger than one which cannot be represented as $2^k$ for k being any natural number), the method comprising:
  generating an intermediate pixel image composed of intermediate pixels, the intermediate pixels obtained by:
    dividing the input image into a plurality of 2×2 pixel arrays having four pixel values; and
    selecting an average value of two pixel values of the four pixel values in each of the 2×2 pixel arrays, the two pixel values being other than a maximum and a minimum value of the four pixel values;
  calculating an interpolated pixel image composed of interpolated pixels by enlarging the input image with an enlargement factor of 2n (n is the smallest integer determined so that 2n is larger than α) to obtain a 2n-times enlarged image, wherein values of the interpolated pixels are determined by interpolation of pixel values of selected pixels of the 2n-times enlarged image;

incorporating the input image, the intermediate pixel image, and the interpolated pixel image into the α-times enlarged image;

generating, using an edge enhancement circuit, output image data through performing edge enhancement processing on the α-times enlarged image data; and driving, using a driver section, the display panel at least partially based on the output image data.

12. The image processing method according to claim 11, wherein, in calculating a pixel value of a second target pixel of the output image data in the edge enhancement processing, a first edge enhancement strength is calculated based on a difference between a pixel value of the second target pixel and a pixel value of a pixel adjacent to the second target pixel, a second edge enhancement strength is calculated by performing limiting processing on the first edge enhancement strength so that an absolute value of the second edge enhancement strength does not exceed a predetermined limit value, and the pixel value of the second target pixel of the output image data is calculated by correcting the pixel value of the second target pixel of the α-times enlarged image described in the α-times enlarged image in response to the second edge enhancement strength.

* * * * *